United States Patent
Ta et al.

(10) Patent No.: US 7,359,884 B2
(45) Date of Patent: Apr. 15, 2008

(54) METHOD AND APPARATUS FOR PROCESSING USAGE RIGHTS EXPRESSIONS

(75) Inventors: Thanh Ta, Huntington Beach, CA (US); Guillermo Lao, Torrance, CA (US); Xin Wang, Torrance, CA (US); Michael C. Raley, Downey, CA (US); Charles P. Gilliam, Darien, CT (US); Manuel Ham, Downey, CA (US); Bijan Tadayon, Germantown, MD (US)

(73) Assignee: ContentGuard Holdings, Inc., Wilmington, DE (US)

( * ) Notice: Subject to any disclaimer, the term of this patent is extended or adjusted under 35 U.S.C. 154(b) by 341 days.

(21) Appl. No.: 10/388,226

(22) Filed: Mar. 14, 2003

(65) Prior Publication Data

US 2004/0019546 A1    Jan. 29, 2004

Related U.S. Application Data

(60) Provisional application No. 60/363,932, filed on Mar. 14, 2002.

(51) Int. Cl.
   *G06Q 99/00*    (2006.01)
(52) U.S. Cl. ............................. 705/59; 705/50; 705/51; 705/57; 726/26; 726/27; 726/30; 726/31; 726/32; 380/200; 380/201; 380/202; 380/203
(58) Field of Classification Search ............ 705/50–59, 705/67; 235/375; 726/26–33; 380/200–203
See application file for complete search history.

(56) References Cited

U.S. PATENT DOCUMENTS 5,091,966 A    2/1992    Bloomberg et al.
5,128,525 A    7/1992    Stearns et al.
5,168,147 A    12/1992   Bloomberg
5,221,833 A    6/1993    Hecht
5,245,165 A    9/1993    Zhang
5,438,508 A    8/1995    Wyman
5,444,779 A    8/1995    Daniele
5,449,895 A    9/1995    Hecht et al.
5,449,896 A    9/1995    Hecht et al.
5,453,605 A    9/1995    Hecht et al.
5,521,372 A    5/1996    Hecht et al.
5,530,235 A    6/1996    Stefik et al.

(Continued)

OTHER PUBLICATIONS

Canonical XML Version 1.0, W3C Recommendation Mar. 15, 2001, http://www.w3.org/TR/2001/REC-xml-c14n-20010315, pp. 1-28.

*Primary Examiner*—Jalatee Worjloh
(74) *Attorney, Agent, or Firm*—Marc S. Kaufman; Nixon Peabody LLP

(57) ABSTRACT

A system and method for processing a rights expression for association with an item for use in a system for controlling use of the item in accordance with the rights expression. A rights expression is specified in a conventional manner in an original format. An intermediate format of the rights expression is generated based on at least one of syntax information and semantics information associated with the original format. The rights expression specifies a manner of use of said item for enforcement on a device. The intermediate format can be converted to a device specific format or a simplified format for resource constrained devices to permit rights enforcement on various devices.

70 Claims, 13 Drawing Sheets

U.S. PATENT DOCUMENTS

| | | | |
|---|---|---|---|
| 5,576,532 A | 11/1996 | Hecht | |
| 5,629,980 A | 5/1997 | Stefik et al. | |
| 5,634,012 A | 5/1997 | Stefik et al. | |
| 5,638,443 A | 6/1997 | Stefik et al. | |
| 5,684,885 A | 11/1997 | Cass et al. | |
| 5,715,403 A | 2/1998 | Stefik | |
| 5,864,127 A | 1/1999 | Jackson et al. | |
| 6,000,613 A | 12/1999 | Hecht et al. | |
| 6,076,738 A | 6/2000 | Bloomberg et al. | |
| 6,182,901 B1 | 2/2001 | Hecht et al. | |
| 6,208,771 B1 | 3/2001 | Jared et al. | |
| 6,233,684 B1 | 5/2001 | Stefik et al. | |
| 6,236,971 B1 | 5/2001 | Stefik et al. | |
| 6,253,193 B1 | 6/2001 | Ginter et al. | |
| 6,311,214 B1 | 10/2001 | Rhoads | |
| 6,384,829 B1* | 5/2002 | Prevost et al. | 345/473 |
| 6,434,525 B1* | 8/2002 | Nagisa et al. | 704/260 |
| 6,922,670 B2* | 7/2005 | Yamada et al. | 704/270.1 |
| 2001/0042057 A1* | 11/2001 | Ikebe et al. | 706/11 |
| 2002/0099545 A1* | 7/2002 | Levitt et al. | 704/247 |
| 2002/0153409 A1* | 10/2002 | Yu | 235/375 |
| 2003/0157983 A1* | 8/2003 | Kobayashi et al. | 463/31 |

* cited by examiner

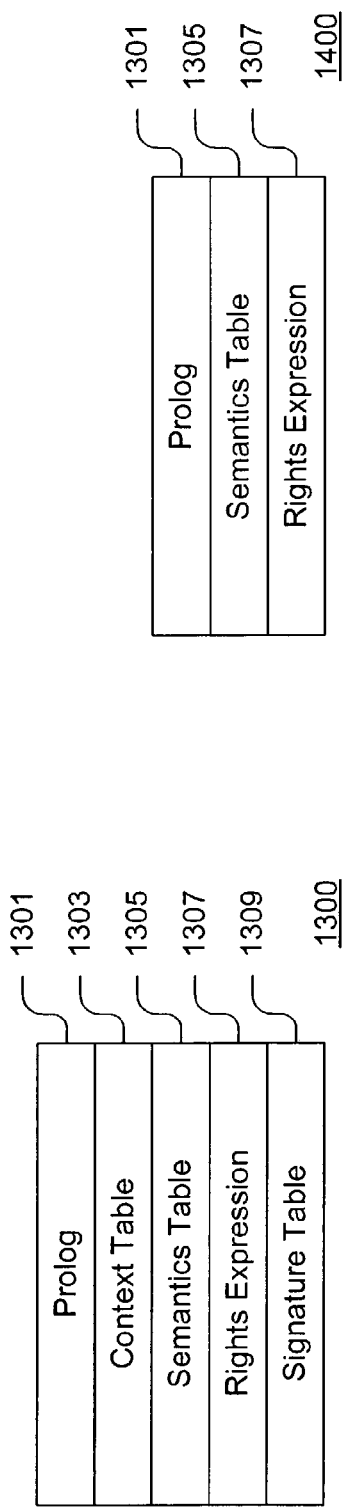
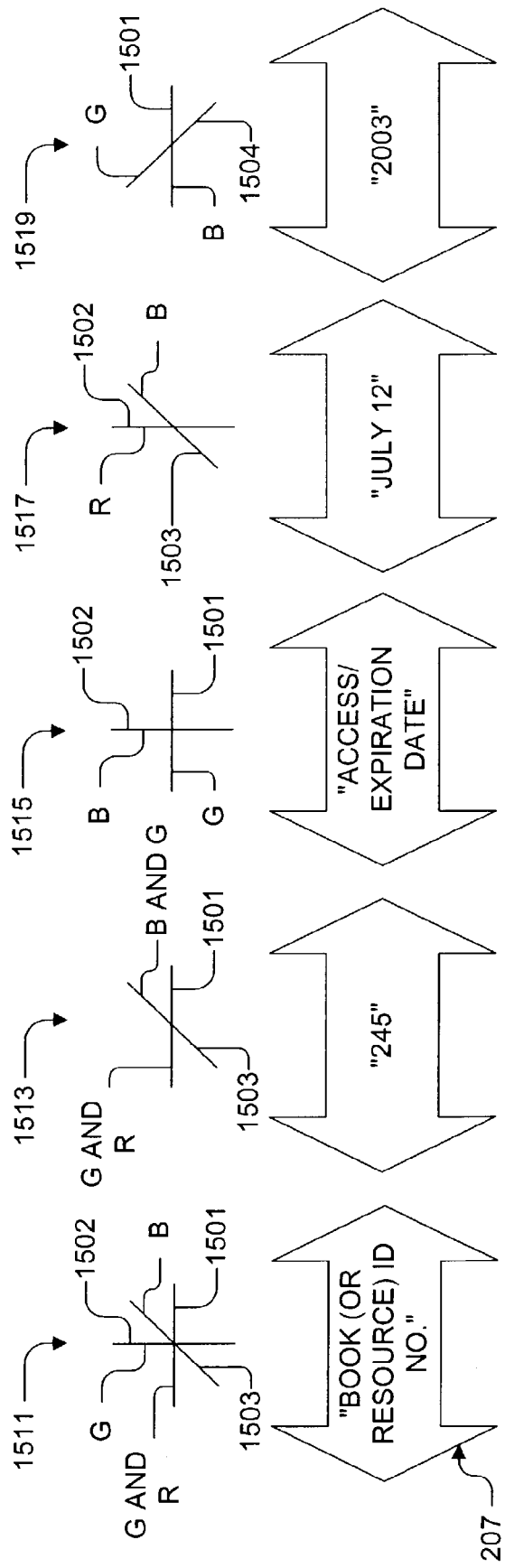
FIG. 14
FIG. 13
FIG. 15

METHOD AND APPARATUS FOR PROCESSING USAGE RIGHTS EXPRESSIONS

CROSS REFERENCE TO RELATED DOCUMENTS

The present invention claims benefit of priority under 35 U.S.C. § 119(e) to commonly assigned, now abandoned, U.S. Provisional Patent Application Ser. No. 60/363,932 of Raley et al., entitled "USE OF RIGHTS EXPRESSIONS IN APPLICATIONS WITH PERFORMANCE CONSTRAINTS," filed on Mar. 14, 2002, the entire disclosure of which is hereby incorporated by reference herein.

BACKGROUND OF THE INVENTION

1. Field of the Invention

This invention generally relates to controlling use of content, or other items, through usage rights associated with the content or other items, and more particularly to a method and apparatus for multi-pass interpretation of usage rights expressions.

2. Description of Related Art

One of the most important issues concerning the widespread distribution of digital content, such as documents, music, movies, software, information, in forms usable by computing devices, via electronic means, and the Internet in particular, is the provision of the ability to enforce the intellectual property rights during the distribution and use of the digital content. Technologies for resolving this problem are referred to as Digital Rights Management (DRM) herein. However, there are a number of issues to be considered in effecting a DRM system, such as authentication, authorization, accounting, payment and financial clearing, rights specification, rights verification, rights enforcement, and document protection issues, to name but a few.

in the world of printed documents and other physical content, a work created by an author is usually provided to a publisher, which formats and prints numerous copies of the work. The copies are then sent by a distributor to bookstores or other retail outlets, from which the copies are purchased by end users. While the low quality of copying and the high cost of distributing printed material have served as deterrents to unauthorized copying of most printed documents, it is much easier to copy, modify, and redistribute unprotected digital content with high quality. Therefore, there is a need for mechanisms to protect digital content.

Accordingly, commonly assigned U.S. Pat. No. 5,634,012 discloses a DRM system for controlling the distribution of digital content, wherein devices of the DRM system can include a repository associated therewith. A predetermined set of usage transaction steps define a protocol used by the repositories for enforcing usage rights associated with the content. Usage rights persist with the content and the usage rights associated with the content comprise a digital work. The usage rights can permit various manners of use of the content, such as a right to view or print or display the content, a right to use the content only once, a right to distribute or redistribute the content. Such usage rights can be made contingent on payment or other conditions.

SUMMARY OF THE INVENTION

The above and other needs are addressed by embodiments of the present invention, which provide an improved system and method for expressing usage rights for content or other items based on modulated or varied signals or graphical representations of the usage rights.

Accordingly, in one aspect, there is provided a method for processing a rights expression for association with an item for use in a system for controlling use of the item in accordance with the rights expression. The method comprises specifying a rights expression in an original format and generating an intermediate format for the rights expression based on at least one of syntax information and semantics information associated with the original format. The rights expression specifies a manner of use of the item for enforcement on a device.

Still other aspects, features, and advantages of the present invention are readily apparent from the following detailed description, simply by illustrating a number of exemplary embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 13 is a schematic illustration of an exemplary structure of a binary format that can be generated by the exemplary multi-pass interpretation processes of FIG. 2;

FIG. 14 is a schematic illustration of an exemplary structure of an enforceable format that can be generated by the exemplary multi-pass interpretation processes of FIG. 2; and FIG. 15 illustrates an exemplary symbolic representation of a rights expression that can be generated by the Digital Rights Management systems of FIGS. 1, 4 and 5.

DETAILED DESCRIPTION OF THE INVENTION

Figure 1:
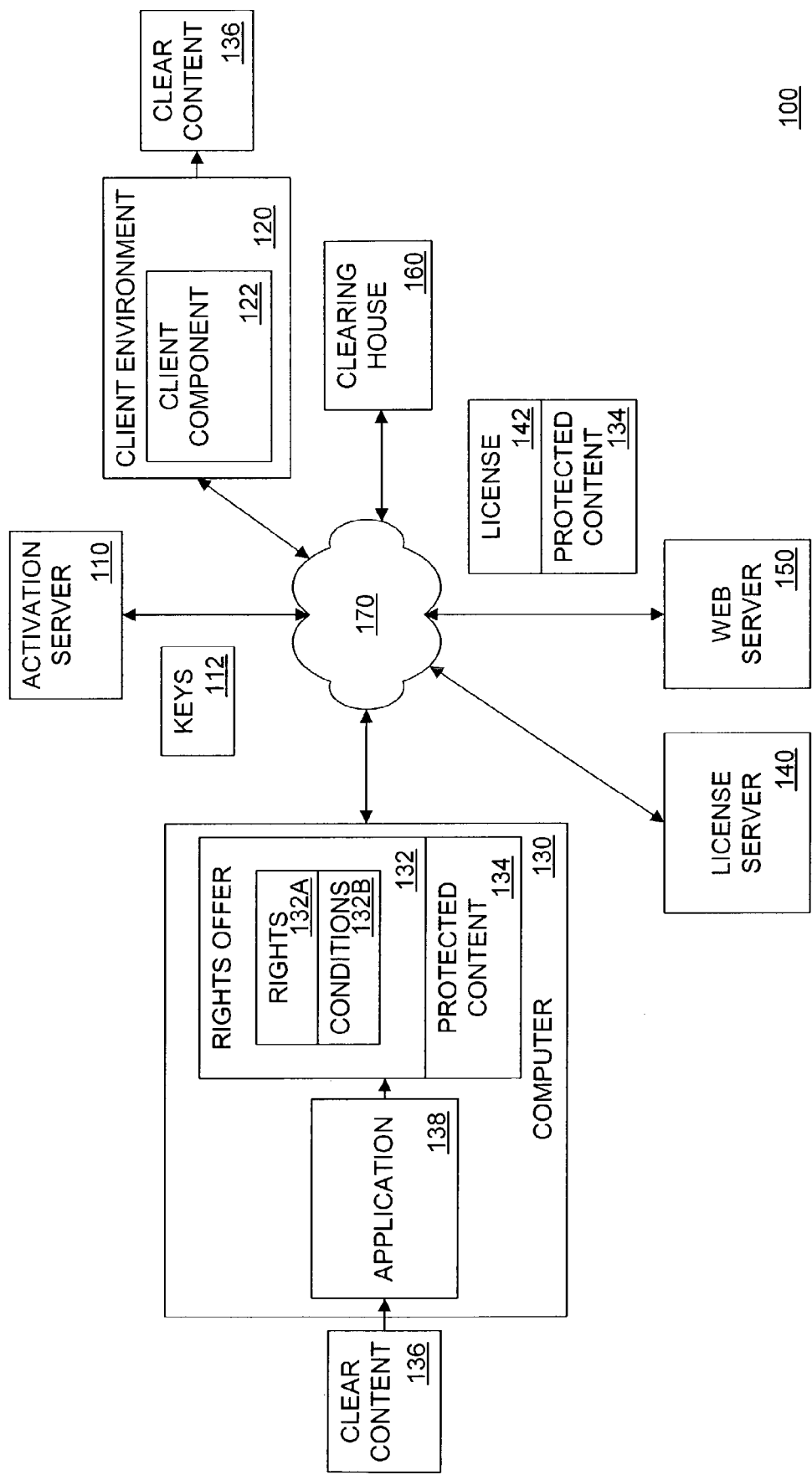
FIG. 1 is a schematic illustration of an exemplary Digital Rights Management system on which various embodiments of the present invention can be implemented.

A method and apparatus for multi-pas interpretation of usage rights expressions are described. In the following description, for purposes of explanation, numerous specific details are set forth in order to provide a thorough understanding of the present invention. It is apparent to one skilled in the art, however, that the present invention can be practiced without these specific details or with equivalent arrangements. In some instances, well-known structures and devices are shown in block diagram form in order to avoid unnecessarily obscuring the present invention.

The present invention includes recognition that authentication, authorization, accounting, payment and financial clearing, rights specification, rights verification, rights enforcement, and document protection issues can be addressed by a Digital Rights Management system. Commonly assigned U.S. Pat. Nos. 5,530,235, 5,629,980, 5,634,012, 5,638,443, 5,715,403, 6,233,684, and 6,236,971, the entire disclosures of all of which are hereby incorporated by reference herein, disclose DRM systems addressing these and other issues.

In addition, the present invention includes recognition that the processing of rights expressions encoded with a native grammar-based language, such as XrML, an XML-based language, can involve resource intensive operations numerous resources can be employed for parsing and processing encoded rights expressions. In addition, the encoded rights expressions can be very complex and lengthy, entailing multiple and repeated parsing and interpretation tasks. Further, latency, real-time demands, can entail high-performance interpretation of a large number of encoded rights expressions.

Accordingly, such a computational burden can be quite taxing on various types of systems, devices, platforms, such as systems and devices with limited resources, small devices, handheld devices, systems and platforms responsible for processing large amounts of rights expressions within a limited amount time. Therefore, there is a need for a system and method for easing the computational burden for the processing of encoded rights expressions in a robust and reliable manner.

the exemplary embodiments described herein address the above and other needs by providing improved systems and methods, whereby a grammar-based rights expressions can be simplified, optimized, and translated into exemplary data, formats, that can be processed with increasing efficiency, that can be better matched to resources of a targeted computing environment. In exemplary embodiment, the targeted computation environment can include a targeted device, component, application, function, system, platform. In an exemplary embodiment, a grammar-based language, such as extensible rights Markup Language (XrML), extensible Access Control Markup Language (XACML), Open Digital Rights Language (ODRL), an extensible Markup Language (XML)-based language, can be employed for specifying a rights expression. However, any suitable grammar, language, can be employed in practicing the exemplary embodiments.

The exemplary embodiments can be directed to improved methods and systems, whereby a grammar-based rights expressions can be simplified, optimized, translated, into the exemplary data, formats, that can be processed with increasing efficiency, that can be better matched to resources of the targeted computing environment. The exemplary embodiments can be referred to as multi-pass interpretation, because various stages of interpretation can be employed, wherein a grammar-based rights expression can be simplified into the exemplary data, format, that can be more suitable for the targeted computing environment.

In an exemplary embodiment, the processes of evaluation, interpretation, of a rights expression can be partitioned into multiple processing steps the intermediate results of each processing step can be saved as exemplary data, as an exemplary format, that at a later time can be evaluated, interpreted, or so that the processes of evaluation, interpretation, can be can be resumed at later time. The resulting exemplary formats of the intermediate results can be referred to as intermediate formats. However, the formats described herein are of an exemplary nature, and any suitable type of format, can be employed to capture the results from the processes of the exemplary embodiments, as will now be further described.

Referring now to the drawings, wherein like reference numerals designate identical or corresponding parts throughout the several views, and more particularly to FIG. 1 thereof, there is illustrated a DRM system 100 that can be used in connection with the described exemplary embodiments to specify and enforce usage rights for content, services, or other property. In FIG. 1, the DRM system 100 includes a user activation component in the form of an activation server 110 that issues a set of public and private key pairs 112 to a content user in a protected fashion. Typically, when the user uses the DRM system 100 for the first time, the user installs software that works with, or includes, a rendering application for a particular content format.

The software is installed in a client environment 120 such as a computing device associated with the user. The software can be part of the DRM system 100 and can be used to access protected content 134. After the installation, the software can be activated. During the activation process, some information is exchanged between the activation server 110 and the client environment 120. A client software component 122 can be downloaded and installed in the client environment 120. The client software component 122 can be tamper resistant and can include the set of public and private key pairs 112 issued by the activation server 110, as well as other components.

A rights offer 132 can be associated with the protected content 134 and can specify usage rights 132A, having a manner of use, that are available to an end-user when one or more corresponding conditions 132B are satisfied. A license server 140 manages the encryption keys 112 and issues a license 142 for the protected content 134. The license 142 can embody the actual granting of the usage rights 132A to the end user the rights offer 132 may grant the end user the right to view the protected content 134 on the condition of payment of a fee of five dollars, and the right to print the protected content on the condition of payment of a fee of ten dollars. The license 142 can be issued for the view right when the five dollar fee has been paid and/or for the print right when 10 dollar fee has been paid. The client component 122 interprets and enforces the rights that have been specified in the license 142.

Clear content 136, such as unprotected content, can be prepared with an application 138, such as a document preparation application, installed on a computer 130 associated with a content publisher, a content distributor, a content service provider, or any other suitable party. Preparation of the clear content 136 can include specifying the rights 132A and the conditions 132B under which the clear content 136 can be used, associating the rights offer 132 with the clear content 136, and protecting the clear content 136 with a cryptography algorithm to generate the protected content 134. A rights language, such as XrML, XACML, ODRL, can be used to specify the rights offer 132. However, the rights offer 132 can be specified in any suitable manner. Also, the rights offer 132 can be in the form of a pre-defined specification, profile, template, that can be associated with the protected content 134. Accordingly, the process of specifying the rights offer 132 can include any suitable process for associating rights, conditions, with content. The rights offer 132 associated with the protected content 134 and the encryption key 112 used to encrypt the clear content 136 can be transmitted to the license server 140.

A typical workflow for the DRM system 100 can include a user operating within the client environment 120 being activated for receiving the protected content 134 by the activation server 110. The activation process results in the public and private key pair 112, and some user and/or machine-specific information, being downloaded to the client environment 120 in the form of the client software component 122. The activation process can be accomplished at any suitable time prior to the issuing of the license 142.

When the user wishes to use the protected content 134, the user makes a request for the protected content 134 the user might browse a Web site running on a Web server 150, using a browser installed in the client environment 120, and attempt to download the protected content 134. During this process, the user may go through a series of steps possibly including a fee transaction, such as in the sale of content, other transactions, such as collection of information. When the appropriate conditions and other prerequisites, such as the collection of a fee and verification that the user has been activated, are satisfied, the Web server 150 contacts the license server 140 through a secure communications channel, such as a channel using a Secure Sockets Layer (SSL). The license server 140 then generates the license 142 for the protected content 134 and the Web server 150 downloads both the protected content 134 and the license 142. The license 142 can include the appropriate usage rights of the usage rights 132A and can be downloaded from the license server 140 or an associated device. The protected content 134 can be downloaded from the computer 130 associated with a publisher, distributor, or other party. The rights offer 132 can be persistent and remain associated with the protected content 134.

The client software component 122 in the client environment 120 can then proceed to interpret the license 142 and allow use of the protected content 134 based on the rights 132A and the conditions 132B specified in the license 142. The interpretation and enforcement of the usage rights are further described in commonly assigned U.S. Pat. Nos. 5,530,235, 5,629,980, 5,634,012, 5,638,443, 5,715,403, 6,233,684, and 6,236,971. The above steps can take place sequentially, approximately simultaneously, in various orders.

The DRM system 100 addresses security aspects of protecting the protected content 134. In particular, the DRM system 100 can authenticate the license 142 that has been issued by the license server 140. One way to accomplish such authentication is for the client software component 122 to determine if the licenses 142 can be trusted. In other words, the client software component 122 can include the capability to verify and/or validate the cryptographic signature, or other identifying characteristic of the license 142. During the activation step described above, the client environment 120 and the license server 140 can receive the set of keys 112 in a tamper-resistant software package that can include other components, such as the client software component 122 for the activated client environment 120 to verify the signature of the license 142.

The DRM system 100 is of an exemplary nature and can be implemented in numerous other equivalent arrangements the license 142 and the protected content 134 can be distributed from different entities. As another example, the rights offer 132 can be associated with the protected content 134 by a party other than the party preparing the protected content 134. As a further example, a clearinghouse 160 can be used to process payment transactions and verify payment prior to issuing the license 142. Moreover, the various processes and transactions can be performed via online and/or offline environments and/or combinations thereof an end user could download content to a computer and then transfer the content from the computer to a personal digital assistant (PDA). The end user could then buy a license for the content via a supermarket kiosk, a cash register, a prep-paid license card, and then transfer the license to the PDA. The end user could then activate the content for use on the PDA and/or the computer. In such an offline scenario, the various devices can, but need not, communicate directly with one another and information can be exchanged in any suitable manner, such as by physically moving media between the devices.

Figure 2:
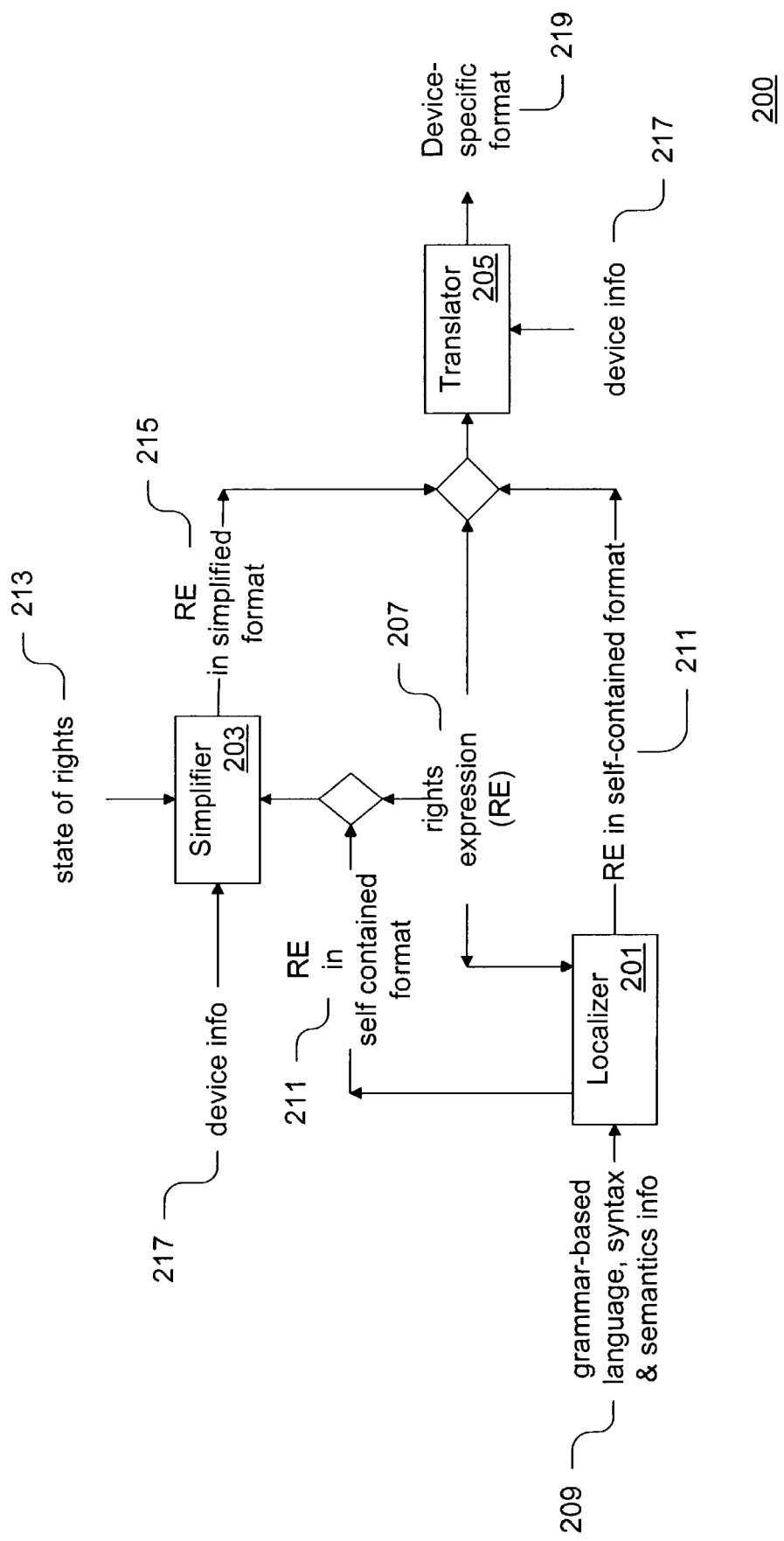
FIG. 2 is a schematic illustration of exemplary multi-pass interpretation processes that can be implemented on the Digital Rights Management systems of FIGS. 1, 4 and 5.
Figure 4:
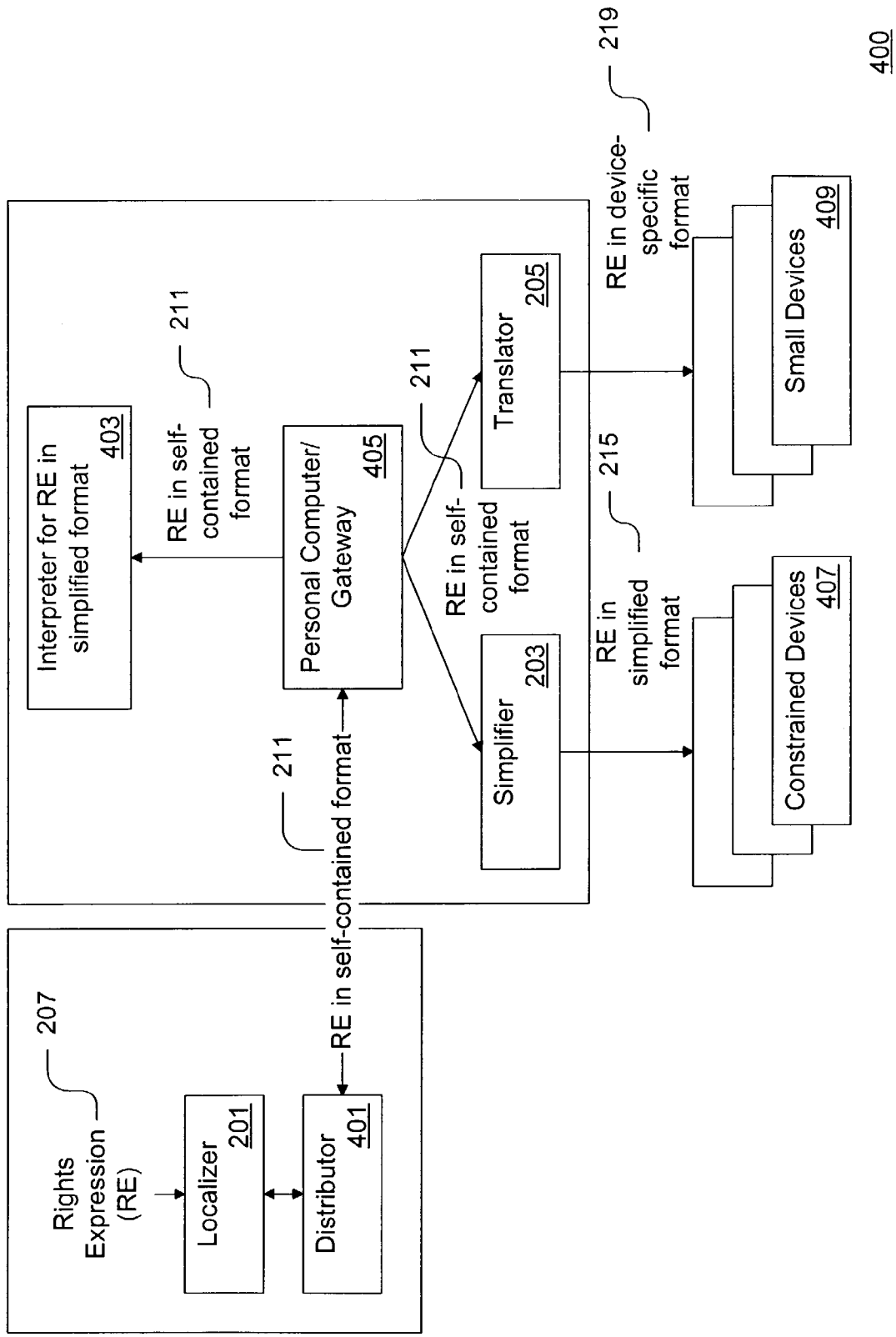
FIG. 4 is a schematic illustration of an exemplary Digital Rights Management system, according to another embodiment.
Figure 5:
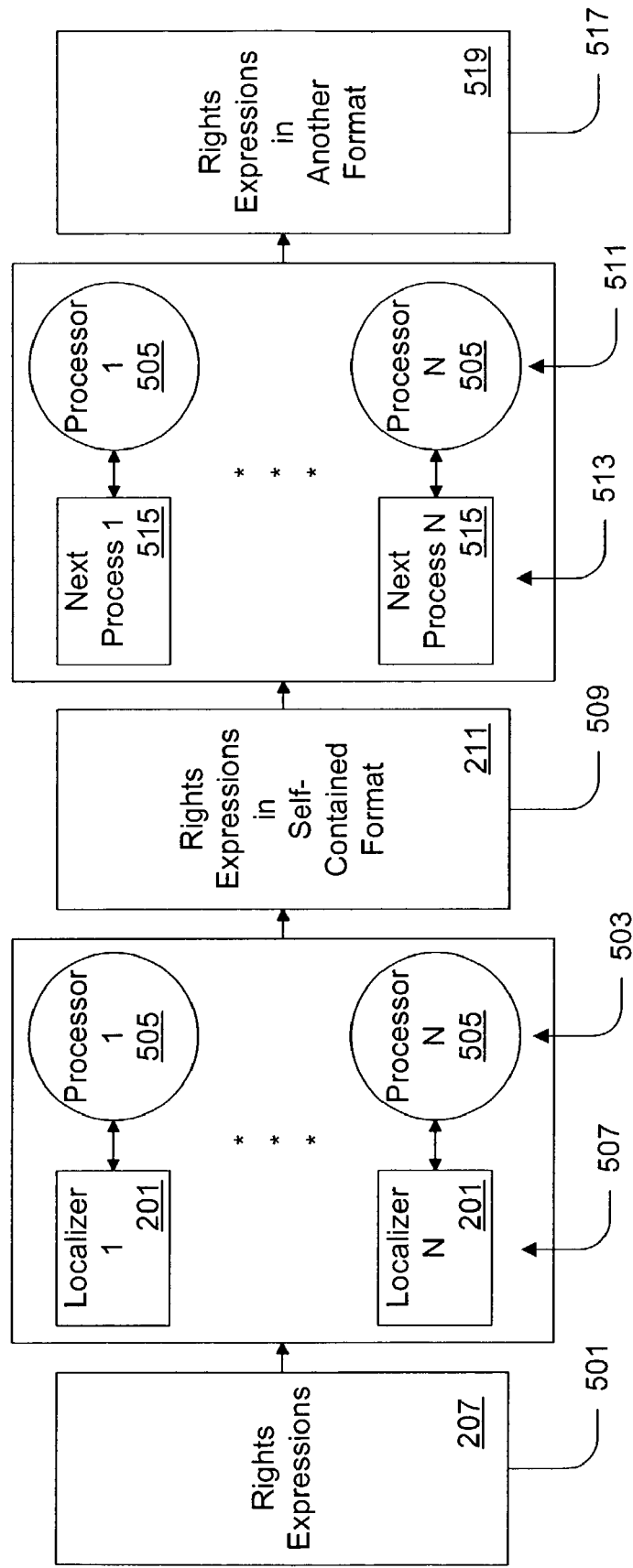
FIG. 5 is a schematic illustration of an exemplary Digital Rights Management system, according to another embodiment.

FIG. 2 is a schematic illustration of exemplary multi-pass interpretation processes 200 that can be implemented on one or more of the devices and sub-systems of the Digital Rights Management systems of FIGS. 1, 4 and 5. In FIG. 2, the exemplary multi-pass interpretation processes 200 can include exemplary localizer processes 201, exemplary simplifier processes 203, and exemplary translator processes 205. The exemplary localizer processes 201 can receive a rights expression 207 in a grammar-based language, such as XrML, and rights expression language information 209 including syntax information, semantics information. The exemplary localizer processes 201 can convert the rights expression 207 into an intermediate format that can be referred to as in an exemplary self-contained format 211 based on and the grammar-based rights expression language information 209.

The exemplary simplifier processes 203 can receive the rights expression 207, the rights expression 207 in the exemplary self-contained format 211, state of rights information 213, device information 217 for the targeted computing environment. The exemplary simplifier processes 203 can convert the rights expression 207, the rights expression 207 in the exemplary self-contained format 211, to an exemplary intermediate format that can be referred to as an exemplary simplified format 215 based on the state of rights information 213, the device information 217.

The exemplary translator processes 205 can receive the rights expression 207, the rights expression 207 in the exemplary self-contained format 211 or the rights expression 207 in the exemplary simplified format 215, along with the device information 217. The exemplary translator processes 205 can convert the rights expression 207, the rights expression 207 in the exemplary self-contained format 211, the rights expression 207 in the exemplary simplified format 215, into an intermediate format that can be referred to as an exemplary device-specific format 219 based on the device information 217. In an exemplary embodiment, the exemplary localizer processes 201, the exemplary simplifier processes 203, the exemplary translator processes 205, can be implemented on one or more of the devices and sub-systems of the Digital Rights Management systems of FIGS. 1, 4 and 5.

Figure 3:
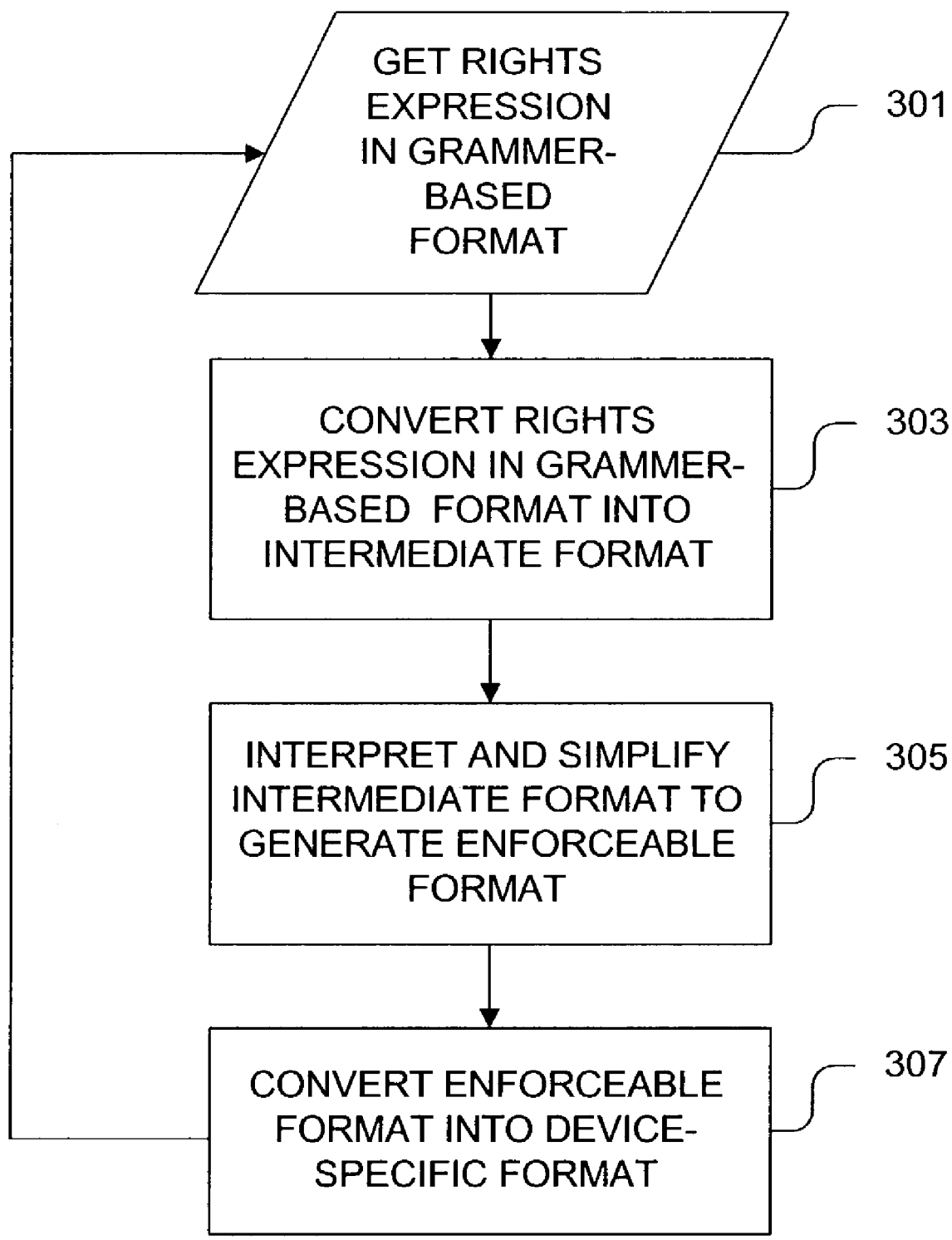
FIG. 3 is a flowchart for illustrating the exemplary multi-pass interpretation processes of FIG. 2.

FIG. 3 is a flowchart for illustrating the exemplary multi-pass interpretation processes 200 of FIG. 2. In FIG. 3, at step 301 the rights expression 207 file in a grammar-based language, such as XrML, can be retrieved for multi-pass interpretation processing. At step 303 the retrieved rights expression 207 can be converted from a native format, such as XrML, into the exemplary self-contained format 211, including an exemplary binary format, such as an XML-based binary format, an XrML-based binary format and the like. In an exemplary embodiment, the rights expression 207 in the exemplary self-contained format 211, can be machine-readable, platform-independent. Thus, the rights expression 207 in the self-contained format 211, does not have to be dependent on any specific processing capability, such as an XML processing capability, an XrML processing capability.

At step 305 the self-contained format 211 can be interpreted, and simplified, to extract a list of conditions, from the rights expressions 207 in the exemplary self-contained format 211. In this way, the rights expression 207 in the exemplary self-contained format 211 can be converted into the exemplary simplified format 215. The rights expression 207 in the exemplary simplified format 215 can include conditions that can be validated, enforced, by the targeted computing environment. In an exemplary embodiment, the exemplary simplified format 215 can be XML-based or XrML-based and can be referred to as an exemplary enforceable format.

At step 307 the rights expression 207 in the simplified format 215 can be converted into the rights expression 207 in the exemplary device-specific format 219 the rights expression 207 in the exemplary device-specific format 219 can be readily executed by the targeted computing environment. Although, the exemplary embodiments can be described in terms of employing the exemplary self-contained format 211, the exemplary simplified format 215, to store intermediate results, any suitable format can be employed to store the intermediate results, the format conversations can be performed in various orders, the format conversations can be repeated multiple times.

The exemplary multi-pass validation and interpretation processes 200 can include the exemplary localizer processes 201, the exemplary simplifier processes 203, and the exemplary translator processes 205. In an exemplary embodiment, the exemplary localizer processes 201 can include devices, components, applications, functions, systems, platforms, responsible for assigning the semantic meaning of keywords, elements, conditions, rights expressions, employed in the rights expression 207, for resolving potential ambiguities within the rights expression 207, for pre-processing the rights expression 207. The exemplary localizer processes 201 can employ the syntax and semantics information 209 of the corresponding rights language to pre-process the rights expressions 207 to generate the rights expression 207 in the exemplary self-contained format 211, which, can include the rights expression 207 in an unambiguous form.

Accordingly, the exemplary self-contained format 211 can include an unambiguous version of the rights expression 207, a semantic meaning of words used in the rights expression 207, and processing instructions for processing the rights expression 207. The format 211 can be considered self-contained, because the rights expression 207 stored in the exemplary self-contained format 211 can be readily processed by any suitable application, system, device, without a need to employ external resources, such as syntax and semantics resources, and language parsing resources.

In an exemplary embodiment, the rights expression 207 can include any suitable expression of a usage right, such as a label, a license, or fragments thereof. A rights expression language, for expressing the rights expression 207, can include any suitable language having predefined syntax and semantics and that can be used to express a usage right. A rights grammar can include a set of predefined symbols, for expressing a usage right. A usage right can include a specification of a permitted manner of use of an item. A label can include a prepackaged set of usage rights not associated with a specific item. A license can include a prepackaged set of usage rights including an item association. A condition can include a specification of one or more prerequisites for exercising a manner of use of an item. An item can include anything for which use can be controlled by associated usage rights, such as digital content, software, services, goods, resources. A resource can include a digital device or portion thereof to which access can be controlled by an associated usage right.

According to a further exemplary embodiment, the rights expression 207 can include, a sequence of expressions for specifying usage rights, conditions, manner of use, policies, principals, subjects. The rights expression 207 further can specify a resource, that the usage rights can be applied to, as well as imposed usage conditions, actions, obligations, that can be satisfied before the granted usage right can be exercised.

In an exemplary embodiment, semantic meanings can be stored within the exemplary self-contained format 211 that can be used to determine the meaning of expressions within the rights expression 207, the meaning of the processing instructions for processing the rights expression 207. Accordingly, the semantic meanings can be used to identify a specific expression within the rights expression 207, such as an expression used for identifying a principal, an expression used for identifying a condition.

By providing both the semantic meanings and the processing instructions, any suitable application, system, device, can efficiently process the rights expression 207 in the exemplary self-contained format 211 without a need to employ external resources. In addition, the exemplary self-contained format 211 can be used to store intermediate results generated by the exemplary localizer processes 201.

In an exemplary embodiment, the exemplary simplifier processes 203 can include devices, components, applications, functions, systems, platforms, responsible for pre-evaluating, and simplifying, the rights expression 207, the rights expression 207 in the exemplary self-contained format 211. The exemplary simplifier processes 203 can employ the state of rights information 213, the device information 217 for the targeted computing environment, to evaluate expressions, such as condition expressions, and rights expressions within the rights expression 207.

Such an evaluation can be employed to determine whether or not a given condition, rights expression, can be removed from the rights expression 207 for the targeted computing environment. For example, a condition, such as payment of fee, that has to be satisfied in order for the targeted computing environment to gain unlimited access to digital content can be expressed within the rights expression 207. If, however, the payment of the fee condition has been satisfied, the step of checking on whether or not the fee has been paid, every time the targeted computing environment attempts to access the digital content, can be eliminated from the rights expression 207.

Accordingly, any suitable condition, rights expression, can be removed from the rights expression 207 for the targeted computing environment, thus, reducing the size of the resulting rights expression 207, the time needed to process the resulting rights expression 207. Thus, the exemplary simplifier processes 203 can generate the rights expression 207 in the exemplary simplified format 215, eliminating any suitable conditions, rights expressions, that need not be verified, validated, for the targeted computing environment. Although, the exemplary embodiments can be described in terms of employing the exemplary simplified format 215 to store intermediate results, of the exemplary simplifier processes 203, any suitable format can be employed to store the intermediate results of the exemplary simplifier processes 203.

In an exemplary embodiment, the exemplary translator processes 203 can include devices, components, applications, functions, systems, platforms, responsible for translating the rights expression 207, the rights expression 207 in the exemplary simplified format 215, the rights expression 207 in the exemplary self-contained format 211, into the rights expression 207 in the exemplary device-specific format 219 for the targeted computing environment. For example, the exemplary device-specific format 219 can include a stream of data that can be processed by the targeted computing environment. Accordingly, the exemplary translator processes 203 can be configured to transmit the rights expression 207 in the exemplary device-specific format 219 as a sequence of bits that can represent data, a data structure, that can be processed by the targeted computing environment. In addition, the exemplary translator processes 203 can be configured to transmit the rights expression 207 in the exemplary device-specific format 219 as a sequence of native instructions that can be processed, executed, by the targeted computing environment.

In an exemplary embodiment, the localizer 201 processes, the simplifier 203 processes, the translator 205 processes, can be independent from one another. In a further exemplary embodiment, however, the localizer 201 processes, the simplifier 203 processes, and the translator 205 processes, can be dependent on one another. In addition, the localizer 201 processes, the simplifier 203 processes, and the translator 205 processes can communicate with each other via any suitable data format, such as the exemplary intermediate formats.

The exemplary multi-pass validation and interpretation processes 200 can be employed to allow flexible configurations of interpretation systems that can be better suited for the targeted computing environment. For example if the targeted computing environment has limited resources or processing capabilities, such as a mobile phone, a handheld device, instead of sending a grammar-based rights expression document, such as an XrML document, to the targeted computing environment, the grammar-based rights expression document can be translated into the exemplary device-specific format 219 before being transmitted to the target environment.

In an exemplary embodiment, the rights expression 207 in the exemplary device-specific format 219 can be configured by the translator 205 processes to be native to the targeted computing environment, which then can be transmitted to the targeted computing environment for execution. FIG. 4 is a schematic illustration of an exemplary Digital Rights Management system 400, wherein a protected item, such as a text document, music, or software, can be used on different devices.

In FIG. 4, the DRM system 400 can be employed to allow digital music to be played on both a personal computer 405 and one or more other devices 409, such MP2 players, MP3 players, set-top boxes, handheld devices. In this embodiment, small devices 409 are devices with specific functions. For example, on MP3 player might only be able to play music and is not able to print or accept payments. In the DRM system 400, the rights expression 207 can be converted into the exemplary self-contained format 211 using the exemplary localizer processes 201, the exemplary simplified format 215 using the exemplary simplifier processes 203.

The converted rights expression 207 then can be sent to the personal computer 405 where the converted rights expression 207 can be processed to authorize the use of the protected digital music. Exemplary distributor processes 401 can be employed to transmit the rights expression 207 in the exemplary self-contained format 211 to the personal computer 405 via the gateway.

From the personal computer 405, a user also can translate the rights expression 207 in the exemplary self-contained format 211 or the exemplary simplified format 215, into the exemplary device-specific format 219 suitable for the small devices 205 using the exemplary translator processes 205. The user then can send both the protected digital music and the associated rights expression 207 in the exemplary device-specific format 219 to the small devices 409, so that the protected digital music can be played on the small devices 409 in accordance with rights expression 207. Accordingly, the rights expression 207 can be converted into the exemplary self-contained format 211 or the exemplary simplified format 215 and then to the exemplary device-specific format 219 as illustrated in FIG. 2 and discussed above.

In an exemplary embodiment, the DRM system 400 can include exemplary interpreter processes 403 which can be configured to process large amounts of rights expressions 207 in the exemplary self-contained format 211. The exemplary self-contained format 211 can include the processing instructions and the semantic meaning of the rights expression 207, resulting in improved performance, for the exemplary interpreter processes 403. Accordingly, the personal computer 405 can process the rights expression 207 in the exemplary self-contained format 211 in an efficient manner. In addition, the rights expression 207 in the exemplary simplified format 215 can be transmitted to one or more resource-constrained devices 407, as shown in FIG. 4. In this embodiment resource constrained devices are multi-purpose devices that do not have syntactical or semantic processing capability.

The exemplary localizer processes 201, the exemplary distributor processes can be implemented in the computer system 130 of FIG. 1, while the personal computer 405, the exemplary interpreter processes 403, the exemplary simplifier processes 203 and the exemplary translator processes 205, can be implemented on the exemplary client environment 120 of FIG. 1. However, the exemplary localizer processes 201, the exemplary distributor processes 401, the exemplary interpreter processes 403, the exemplary simplifier processes 203, and the exemplary translator processes 205, can be implemented on one or more of the devices and sub-systems of the Digital Rights Management systems of FIGS. 1, 4 and 5.

The exemplary embodiments provide flexible configurations that can be ideal for various computing environments, such as resource-constrained computing environments, size-constrained (of function constrained) computing environments, multi-processor computing environments. FIG. 5 is a schematic illustration of an exemplary Digital Rights Management system 500 with a multi-processor capability, according to an exemplary embodiment.

In FIG. 5, the DRM system 500 can be configured, to process large amounts of the rights expressions 207, such as a batch 501, of the of the rights expressions 207 a pool 503 of processors 505 can be configured to enable a respective pool 507 of the exemplary localizer processes 201 to generate a batch 509, of the rights expressions 207 in the exemplary self-contained format 211 from the batch 501 of rights expressions 207. The batch 509 of the rights expressions 207 in the exemplary self-contained format 211 can be further multi-processed.

Accordingly, a pool 511 of processors 505 can be configured to enable a respective pool 513 of next processes 515, such as the exemplary simplifier processes 203 and the exemplary translator processes 205 to generate a batch 517 of the rights expressions 207 in another format 519, such as the exemplary simplified format 215 or the exemplary device-specific format 219. In a further exemplary embodiment, the pool 503 of the processors 505, the pool 507 of the exemplary localizer processes 201, the pool 511 of the processors 505, and the pool 513 of the next processes 515 can be implemented on one or more of the devices and sub-systems of the Digital Rights Management systems of FIGS. 1, 4 and 5.

Figure 6:
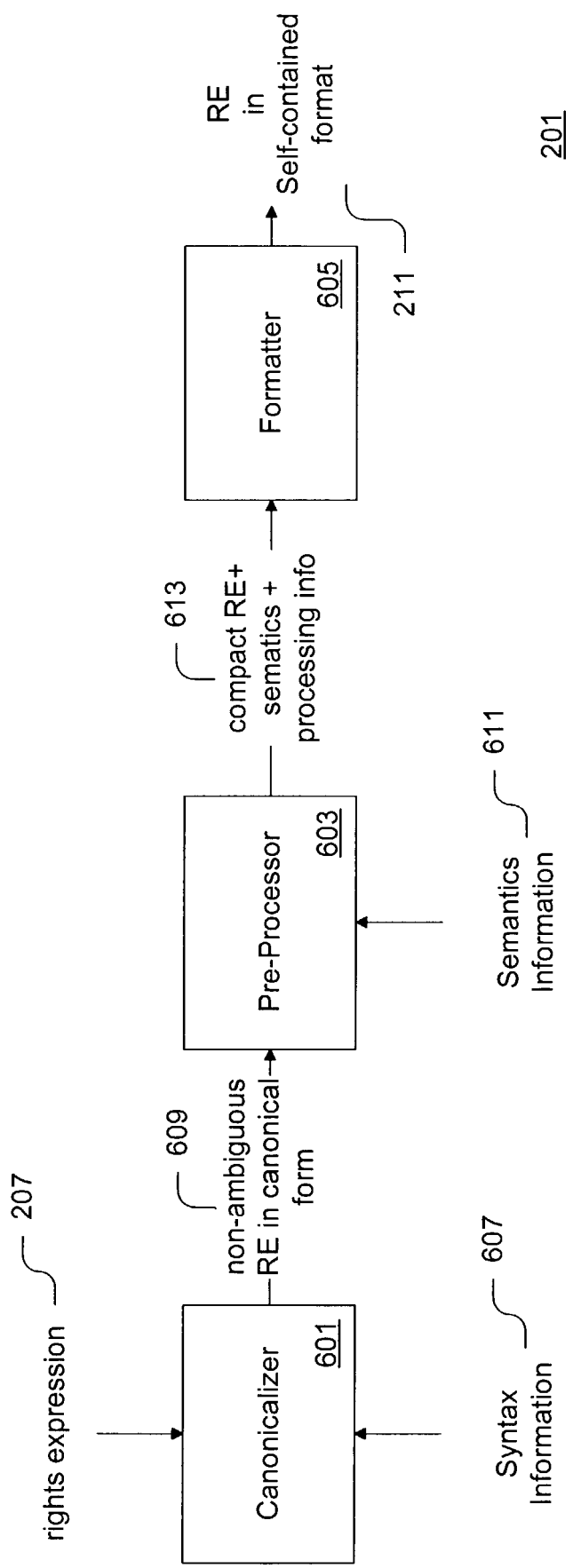
FIG. 6 is a schematic illustration of exemplary localizer processes that can be implemented on the Digital Rights Management systems of FIGS. 1, 4 and 5.

According to the exemplary embodiments, the exemplary localizer processes 201 can be configured to pre-process the rights expression 207, to generate the rights expression 207 in the exemplary self-contained format 211. The exemplary self-contained format 211 can include the rights expression 207 in an unambiguous form, the semantic meaning of one or more keywords, elements, conditions, rights expressions, employed within the rights expressions 207, instructions for processing the rights expressions 207. FIG. 6 is a schematic illustration of the exemplary localizer processes 201 that can be implemented on one or more of the devices and sub-systems of the Digital Rights Management systems of FIGS. 1, 4 and 5.

In FIG. 6, exemplary canonicalizer processes 601 can resolve potential ambiguities within the rights expression 207, based on syntax information 607 of the syntax and semantics information 209 to generate the rights expression 207 in an unambiguous form. In addition, the exemplary canonicalizer processes 601 can convert the unambiguous rights expression 207 into a canonical form 609 as described in greater detail below.

Exemplary pre-processor processes 603 can be employed to process the unambiguous rights expression 207 in the canonical form 609 based on semantics information 611 of the syntax and semantics information 209, to generate processing results 613. The processing results 613 can include, the unambiguous rights expression 207, a context table, a semantics table, the processing instructions. Exemplary formatter processes 605 can package, process, the processing results 613 to generate the rights expression 207 in the exemplary self-contained format 211.

The rights expression 207 in the exemplary self-contained format 211 can include the semantic meaning of the rights expression 207, the processing instructions for the rights expression 207 allowing efficient processing thereof, without a need to employ external resources, such as language parsers, syntax and semantics processors. The rights expression 207 in the exemplary self-contained format 211, can be converted back to the original format of the rights expression 207, such as an XrML format. The rights expression 207 in the exemplary self-contained format 211 can be employed to ease the computational burden of processing the rights expressions 207 for a targeted computing environment having limited storage capabilities, processing capabilities, such as constrained devices 407 of FIG. 4.

The exemplary self-contained format 211 can include the binary format. However, any other suitable format can be employed as the self-contained format 211. When the exemplary binary format is employed as the exemplary self-contained format 211 for rights expression 207 distribution purposes, the rights expression 207 can be digitally signed employing an exemplary binary transformation algorithm.

The exemplary binary transformation algorithm can transform the rights expression 207 into the binary format, for example, while preserving a digital signature between the rights expression 207 in the original format and the exemplary self-contained format 211. The context table, the semantics table, can be pre-built, pre-defined or pre-stored, in the targeted computing environment, thus optimizing storage the rights expression information.

The exemplary canonicalizer processes 601 can be employed to remove ambiguities, if any, in the rights expressions 207. For example, such ambiguities can be based on various choices that can be made with respect to the rights expressions 207, and variations in rights expressions 207 for which some type standardization may be desired.

The exemplary canonicalizer processes 601 converts the unambiguous rights expression 207 into the canonical form 609 many language-based expressions can vary in their physical representations, based on the syntax changes permitted by their respective languages, and still can be logical equivalents within a given application context. The following XML elements can be logically equivalent, even though they can differ in their respective physical representations, as shown below:

```
<doc>
    <e1 />
    <e2 ></e2>
    <e3 name = "elem3" id="elem3" />
</doc>
and
<doc>
    <e1></e1>
    <e2/>
    <e3 id="elem3" name="elem3"></e3>
</doc>
```

The canonical form of the above XML elements, can be:

```
<doc>
    <e1></e1>
    <e2></e2>
    <e3 id="elem 3" name="elem3"></e3>
</doc>
```

Accordingly, the exemplary canonicalizer processes 601 can be employed to convert the unambiguous rights expression 207 into the canonical form 609 based on the syntax and semantics information 209 for the given rights expression language. The exemplary pre-processor processes 603 can be employed to construct the context table for the contexts or namespaces used by the rights expressions 207, and to construct the semantic table for providing meanings for the elements used in the rights expression 207, to generate the processing instructions for processing the rights expression 207.

Figure 7:
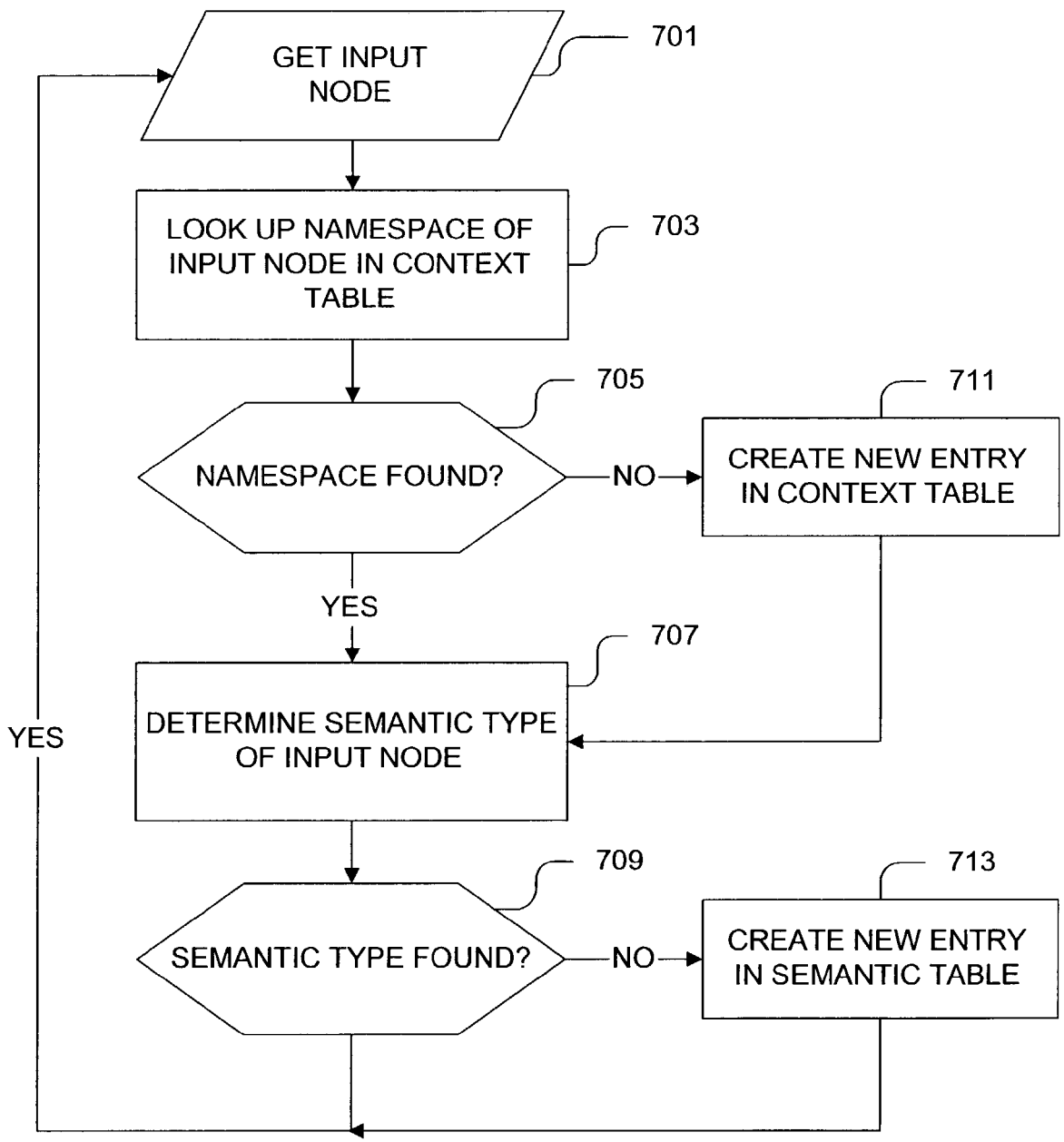
FIG. 7 is a flowchart for illustrating exemplary preprocessor processes of the localizer processes of FIG. 6.

In addition, the exemplary pre-processor processes 603 can covert the unambiguous rights expressions 207 in the canonical form 609 into the format 613 supported by the targeted self-contained format 211 generated by the exemplary formatter processes 605. FIG. 7 is a flowchart for illustrating the exemplary pre-processor processes 603 of FIG. 6. The exemplary pre-processor processes 603 can populate the unambiguous rights expression 207 in the canonical form 609, for example in a Document Object Model (DOM) tree.

In FIG. 7, at step 701 the exemplary pre-processor processes 603 process each child node of a document node by employing a node processing process including steps 703-713. At step 703 the namespace of the input node can be looked up in the context table. If the namespace cannot be found in the context table, as determined at step 705, at step 711, a new entry can be created in the context table using the next available context identification (id).

Otherwise, at step 707 the semantic type of the input node can be determined by looking up the name of the input node in the semantics table. If the semantic type of the input node cannot found in the semantics table, as determined at step 709 at step 713, a new entry can be created the in the semantics table using an element type, an element name, the context id, and the next available element id. The node processing process of steps 703-713 can be repeated for each attribute of an element by calling the node processing process with a corresponding attribute node. In a similar manner, the node processing process of steps 703-713 can be repeated for each child element by calling the node processing process with a corresponding element node.

The context table can include the context id, length of the namespace, and a Uniform Resource Identifier (URI) of the namespace of the context, namespace URI. The context id can be assigned based on the order of occurrence, probability of occurrence, of the namespace of the context within the rights expression 207.

The following first exemplary rights expression in the form of an XrML-based license to play a song, can be used to illustrate a context table, a semantics table, and a predefined type table.

First Exemplary Rights Expression

```
<license xmlns=http://www.xrml.org/schema/2001/11/xrml2core
    xmlns:sx=http://www.xrml.org/schema/2001/11/xrml2sx
    xmlns:dsig=http://www.w3.org/2000/09/xmldsig#
    xmlns:xsi=http://www.w3.org/2001/XMLSchema-instance
    xmlns:cx=http://www.xrml.org/schema/2001/11/xrml2cx
    xmlns:cm=
        http://www.xrml.org/schema/2001/11/xrml2compactMusic
>
<grant>
    <cm:device cmid="123"/>
    <cx.play/>
    <cm:music cmid="456"/>
</grant>
<cm:issuerDevice>
    <cm:device cmid="024"/>
</cm:issuerDevice>
</license>
```

An exemplary context table, based on the first exemplary rights expressing, is illustrated in Table 1.

TABLE 1

Exemplary Context Table.

| context id | length | namespace URI |
|---|---|---|
| 01 | 44 | http://www.xrml.org/schema/2001/11/xrml2core |
| 02 | 42 | http://www.xrml.org/schema/2001/11/xrml2cx |
| 03 | 52 | http://www.xrml.org/schema/2001/11/xrml2compactMusic |

As shown in Table 1, the exemplary context table in the exemplary binary format, can include the context id entries 01-03 assigned based on the order of usage, probability of usage, of the contexts identified by the namespace URM entries in the first exemplary rights expression, and the corresponding length entries of the contexts identified by namespace URI entries.

The semantics table in the exemplary binary format can include an element id, an element type, and element name, and a context id. The element id of the semantics table can be assigned based on the order of occurrence, or probability of occurrence, of an element within the rights expression 207.

An exemplary semantics table, based on the first exemplary rights expression, is illustrated in Table 2 below.

TABLE 2

Exemplary Semantics Table.

| element id | element type | element name | context id |
|---|---|---|---|
| 01 | 10 | license | 0 |
| 02 | 11 | grantGroup | 0 |
| 03 | 12 | grant | 0 |
| 04 | 13 | principal | 0 |
| 05 | 14 | rights | 0 |
| 06 | 15 | resource | 0 |
| 07 | 16 | allConditions | 0 |
| 08 | 17 | condition | 0 |
| 09 | 18 | issuer | 0 |
| 10 | 20 | inventory definition | 0 |
| 11 | 21 | variable definition | 0 |
| 12 | 22 | reference | 0 |
| 20 | 01 | device | 2 |
| 21 | 02 | cmid | 2 |
| 22 | 01 | play | 3 |

TABLE 2-continued

Exemplary Semantics Table.

| element id | element type | element name | context id |
|---|---|---|---|
| 23 | 01 | music | 2 |
| 24 | 01 | issuerDevice | 2 |

The element types having values from 00 to 22 can be optionally included in a semantics table, and can be defined in a pre-defined type table. Accordingly the pre-defined type can be employed, including predefined values for predetermined element types, as illustrated in Table 3 below.

TABLE 3

Exemplary Pre-Defined Type Table.

| element type | element name |
|---|---|
| 00 | next level |
| 01 | element |
| 02 | attribute |
| 03 | value |
| 04 | number of children |
| 10 | license |
| 11 | grantGroup |
| 12 | grant |
| 13 | principal |
| 14 | rights |
| 15 | resource |
| 16 | allCondition |
| 17 | condition |
| 18 | issuer |
| 20 | inventory definition |
| 21 | variable definition |
| 22 | reference |

The first exemplary rights expression converted into the exemplary binary format, based on Tables 1-3, can given as follows:

```
01 03 04 202103123 05 22 06 232103456 09 24 00
 202103024,
where:
 01                  <license>
 03                  <grant>
 04                  principal [Processing instruction]
 2021030123          <cm:device cmid="123"/>
 05                  right [Processing instruction]
 22                  <cx.play>
 06                  resource [Processing instruction]
 232103456           <cm:music cmid="456"/>
 09                  issuer [Processing instruction]
 24                  <cm:issuerDevice>
 00                  next level
 2021030024          <cm:device cmid="024"/>
```

The following second exemplary rights expression in the form of an XrML-based license, including an inventory list, can be used to further illustrate a context table, and a semantics table.

Second Exemplary Rights Expression

```
<license xmlns=http://www.xrml.org/schema/2001/11/xrml2core
         xmlns:sx=http://www.xrml.org/schema/2001/11/xrml2sx
         xmlns:dsig=http://www.w3.org/2000/09/xmldsig#
```

-continued

```
         xmlns:xsi=http://www.w3.org/2001/XMLSchema-instance
         xmlns:cx=http://www.xrml.org/schema/2001/11/xrml2cx
>
  <inventory>
    <cx:digitalWork licensePartId="dvdMovie">
      <cx:metadata>
        <xml>
          <cx:simpleDigitalWorkMetadata>
            <cx:title>Air Force One</cx:title>
          </cx:simpleDigitalWorkMetadata>
        </xml>
      </cx:metadata>
    </cx:digitalWork>
  </inventory>
  <grant>
    <keyHolder>
      <info>
        <dsig:KeyValue>
          <dsig:RSAKeyValue>
          </dsig:RSAKeyValue>
        </dsig:KeyValue>
      </info>
    </keyHolder>
    <cx:play/>
    <cx:digitalWork licensePartIdRef="dvdMovie"/>
  </grant>
</license>
```

An exemplary context table based on the second exemplary rights expression, is illustrated in Table 4 below.

TABLE 4

Exemplary Context Table.

| context id | length | namespace URI |
|---|---|---|
| 01 | 44 | http://www.xrml.org/schema/2001/11/xrml2core |
| 02 | 42 | http://www.xrml.org/schema/2001/11/xrml2cx |
| 03 | 34 | http://www.w3.org/2000/09/xmldsig# |

An exemplary semantics table based on the second exemplary rights expression, is illustrated in Table 5 below.

TABLE 5

Exemplary Semantics Table.

| element id | element type | element name | context id |
|---|---|---|---|
| 01 | 10 | license | 0 |
| 02 | 11 | grantGroup | 0 |
| 03 | 12 | grant | 0 |
| 04 | 13 | principal | 0 |
| 05 | 14 | rights | 0 |
| 06 | 15 | resource | 0 |
| 07 | 16 | allConditions | 0 |
| 08 | 17 | condition | 0 |
| 09 | 18 | issuer | 0 |
| 10 | 20 | inventory definition | 0 |
| 11 | 21 | variable definition | 0 |
| 12 | 22 | reference | 0 |
| 20 | 20 | dvdMovie | 1 |
| 21 | 01 | digitalWork | 2 |
| 22 | 01 | metadata | 2 |
| 23 | 01 | xml | 1 |
| 24 | 01 | simpleDigitalWorkMetadata | 2 |
| 25 | 01 | title | 2 |
| 26 | 01 | keyHolder | 1 |
| 27 | 01 | info | 1 |
| 28 | 01 | KeyValue | 3 |
| 29 | 01 | RSAKeyValue | 3 |
| 30 | 01 | play | 2 |

The second exemplary rights expression converted into the exemplary binary format, based on the exemplary Tables 3-5, can be given as follows:

described in the Canonical XML Version 1.0 from the World Wide Web Consortium (W3C), W3C Recommendation 15 Mar. 2001, available on the World Wide Web (WWW) at

```
01 10 20 21 0022 0023 0024 00250313Air Force One 03 04 26 0027 0028 0029 05 30 06 12 20,
    where:
        01                          <license>
        10                          inventory definition [Processing instruction]
        20                          licensePartId="dvdMovie" <cx:digitalWork licensePartId="dvdMovie">
        21                          <cx:digitalWork>
        0022                        next level <cx:metaData>
        0023                        next level <xml>
        0024                        next level <cx:simpleDigitalWorkMetadata>
        00250313Air Force One       next level <cx:title>Air Force One</cx:title>
        03                          <grant>
        04                          principal [Processing instruction]
        26                          <keyHolder>
        0027                        <info>
        0028                        <dsig:KeyValue>
        0029                        <dsif:RSAKeyValue>
        05                          rights [Processing instruction]
        30                          <cx:play>
        06                          resource [Processing instruction]
        12                          reference to
```

The exemplary canonicalizer processes 601 can be employed to generate unambiguous rights expressions in the canonical form 609 from the rights expressions 207. The term ambiguity can refers to the fact that certain elements, in a rights expression can have default values or can have values where the interpretation can be assumed. For example a rate element in a rights expression can include the optional attribute CurrencyCode, which can default to US dollars (USD). Thus, the $USD 50 rate can be expressed as:

<rate>50</rate>

The above statement can be ambiguous, when the context is not known. Resolving such an ambiguity can include determining a default value, an assumed value, an assumed context, in which the rate element can be expressed. Thus, the unambiguous form of the above expression can include a currency attribute for the rate element, and can be expressed as follows:

<rate currency="USD">50</rate>

Figure 8B:
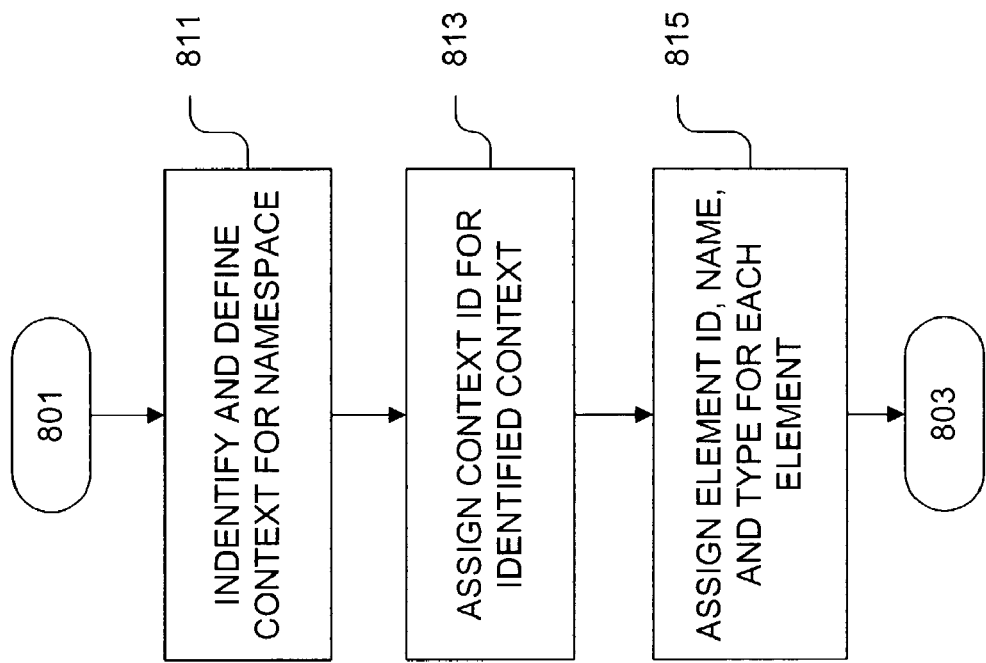
FIGS. 8A-8B are a flowchart for illustrating an exemplary binary transformation algorithm.
Figure 8A:
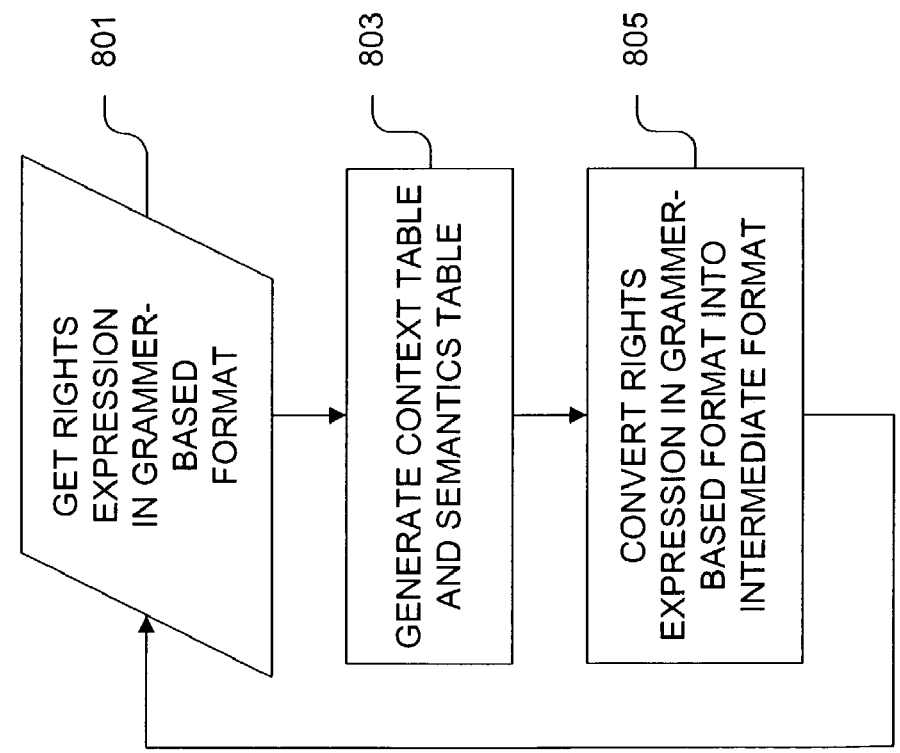

The exemplary localizer processes 201 can be employed to convert the rights expression 207 into the exemplary self-contained format 211. Such a conversion can employ the exemplary binary transformation algorithm. FIGS. 8A-8B are a flowchart for illustrating the exemplary binary transformation algorithm.

In FIG. 8A, at step 801, for example, rights expressions, for example in the form of a rights expression document, file, such as an XrML, document, file, can be retrieved for processing. At step 803, for example the syntax of the rights expressions can be verified to remove ambiguities. Then, for example, the rights expressions can be converted into their canonical.

For example many rights expressions can vary in physical representations, for example based on permitted syntax changes, but still can be logical equivalents within a given application context. Accordingly, the rights expressions can be canonicalizer into the canonical form. In an exemplary embodiment, the rights expressions with the same canonical form can be configured as logical equivalents using any suitable algorithm, for example, such as the algorithm <http://www.w3.org/TR/2001 /REC-xml-cl4n-20010315>, incorporated by reference herein.

At step 803, for example the context table and semantics table can be generated. At step 805, for example the rights expressions can be translated into the exemplary binary format, for example, using the corresponding context table and semantics table.

In an exemplary embodiment, the exemplary localizer processes 201 can be employed, for example to resolve default values for optional elements, attributes, in a rights expression document, file, removing ambiguities in the rights expression document. FIG. 8B further illustrates the step 803 in FIG. 8A that can be used for generating the semantics table.

In FIG. 8B, at step 811 a semantics table can be generated for each namespace declared in the rights expression document, wherein the context for each namespace declared in the rights expression document can be identified, defined. For example the syntax and semantics of many grammar-based languages, such as XrML, can be defined in many independent schemes, wherein each schema can be employed to define its own set of keywords, semantic meanings for the keywords. A context id for each schema used in the rights expression document can be identified and assigned.

At step 813 each identified context can be assigned a context id based on the of occurrence, probability of occurrence, within the rights expression document. If a rights expression language can be extensible and derived from a core or base language, the first employed context id can be assigned to the core context, regardless of where the elements of the core context can be used within the rights expression. However, a context id can be assigned in any suitable order.

At step 815 for each namespace, an element id, an element type, and an element name for each element declared in the rights expression document can be identified and assigned. The element id can be assigned based on the order of occurrence, probability of occurrence, of an element within the rights expression document. Thus, each entry in the semantics table can include an element id, an element type, an element name, and a context id.

Figure 9:
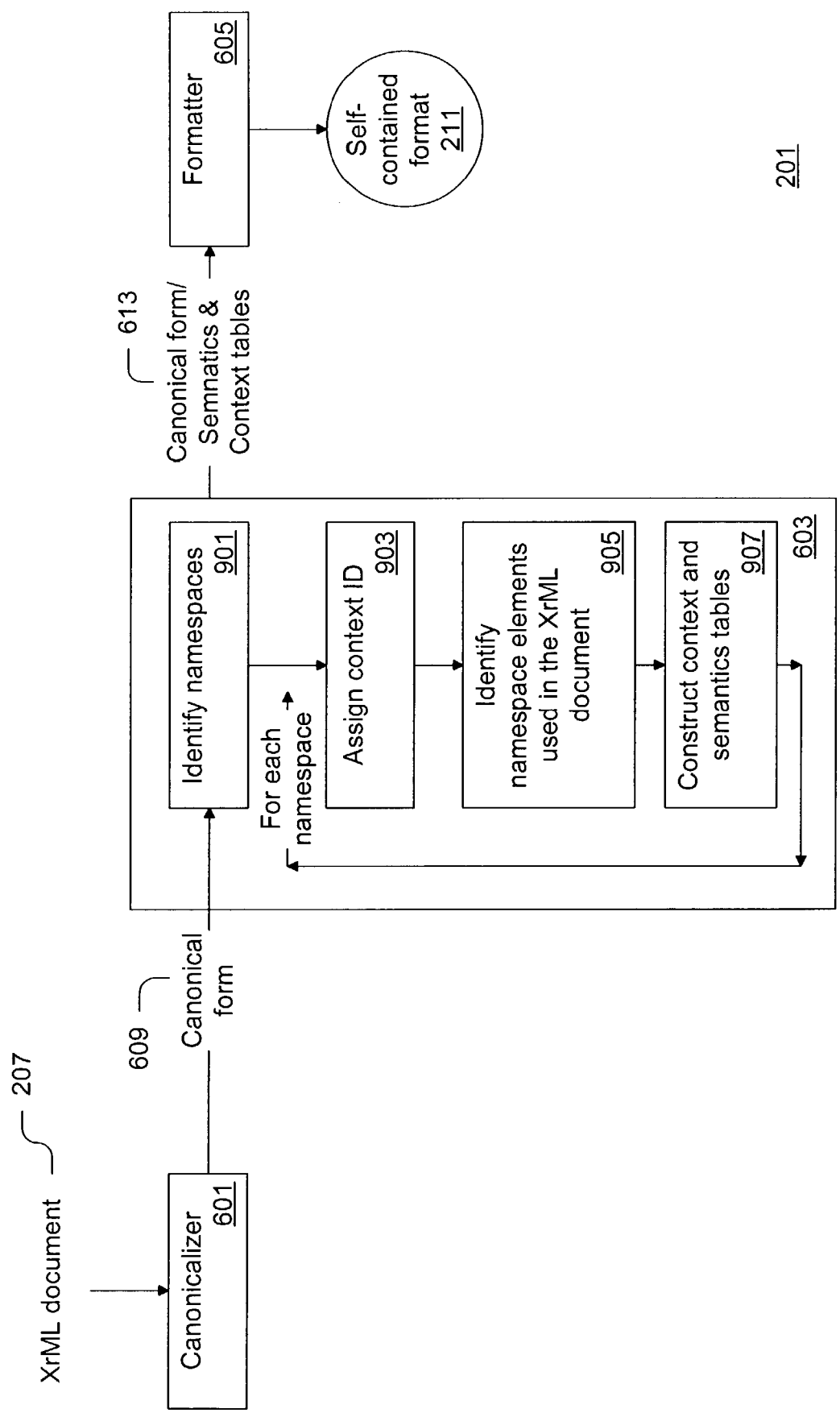
FIG. 9 is a schematic illustration of exemplary preprocessor processes of the localizer processes of FIG. 6.

FIG. 9 is a schematic illustration of the exemplary preprocessor processes 603 of the exemplary localizer processes 201 of FIG. In FIG. 9 the exemplary processes 901-907 perform one or more of the steps of exemplary binary transformation algorithm described with respect to FIGS. 8A-8B. The exemplary binary transformation algorithm, also can be employed to perform a binary transformation on a digital signature, such as an XML digital signature. The transformed signature can be a binary representation of an original signature, thereby preserving the original signature. In addition, employing the exemplary binary transformation algorithm, preserves the integrity of the digital signatures, preserves the semantic meanings.

The exemplary self-contained format 211 can be made independent of resources, such as a XML parser, can provide improvements in processing, and can provide improvements in transmission performance. Accordingly, the exemplary self-contained format 211 can be targeted to a wide variety of computing environments such as computing environments having limited resource capabilities, limited processing capabilities, limited storage capabilities, limited functions.

A semantic meaning of the elements of a rights expression can be stored in a semantics document, such as a XML schema document. The rights expression can be digitally signed and the signature can be employed to protect the rights expression. However, the semantics document can be in a document that is distinct from the document including the rights expression.

The present invention includes recognition that the semantics document can be hacked, modified. In this way, the meanings employed for processing, evaluating, validating a digitally signed rights expression can be changed without comprising the integrity of the digitally signed rights expression. The above and other problems are addressed and solved by employing a digital signature, for protecting a rights expression, semantic meanings for the rights expression.

Accordingly, the semantic meanings for a rights expression and the rights expression can be included in separate documents, files, and a digital signature, referred to as a signature envelope, can be employed, and included in an envelope document, file. The signature envelope can include fingerprints, hash values, for the rights expression document and the semantic meanings document.

In an exemplary embodiment, the signature envelope, in the form of a digital signature, such as a XML digital signature can be employed to protect the rights expression document, the semantic meanings document. An exemplary signature envelope that can be employed for protecting the rights expression document, the semantic meanings document, is as follows:

```
<Signature>
    <SignatureInfo...>
        <CanonicalizationMethod>...</CanonicalizationMethod>
        <SignatureMethod>...</SignatureMethod>
        <Reference URI="Reference to Right expression">
            ...
            <DigestValue>...</DigestValue>
        </Reference>
        <Reference URI="Reference to Semantics doc">
            ...
            <DigestValue>...</DigestValue>
        </Reference>
    </SignatureInfo>
    <SignatureValue>...</SignatureValue>
</Signature>
```

In the above exemplary signature envelope, the <SignatureInfo . . . > element can include the signature envelope information, the <Reference URI="Reference to Right expression"> element can include a pointer to and a fingerprint, hash value, of the rights expression document, the <Reference URI="Reference to Semantics doc"> element can include a pointer to and a fingerprint, hash value, of the semantics document, and the <SignatureValue> . . . </SignatureValue>element can include a signature of the signature envelope.

The semantic meanings for the rights expression and the rights expression can be included in a binary document, file, and the signature envelope can be included in an envelope document. The signature envelope can include fingerprints, hash values, for the binary document, including the rights expression, and the semantic meanings for the rights expression.

An exemplary signature envelope that can be employed to protect the binary document, is as follows:

```
<Signature>
    <SignatureInfo...>
        <CanonicalizationMethod>...</CanonicalizationMethod>
        <SignatureMethod>...</SignatureMethod>
        <Reference URI="...">
            <Transform Algorithm="XrML Binaty"/>
            <DigestValue>...</DigestValue>
        </Reference>
    </SignatureInfo>
    <SignatureValue>...</SignatureValue>
</Signature>
```

In the above exemplary signature envelope the <Reference URI="..."> element can include a pointer to and a fingerprint, hash value, of the binary document, the <Transform Algorithm="XrML Binary"/> element can indicate that the exemplary binary transformation algorithm is employed, and the <SignatureValue> . . . </Signature Value>element can include a signature of the binary document.

In an exemplary embodiment, a rights expression interpreter can be configured to process a request, such as a request to perform an operation, a request to view a document, based on a rights expression, which can result in the authorization of the request. However, the exemplary simplifier processes 203 can be employed for processing rights expressions without a need for employing a request.

Figure 10:
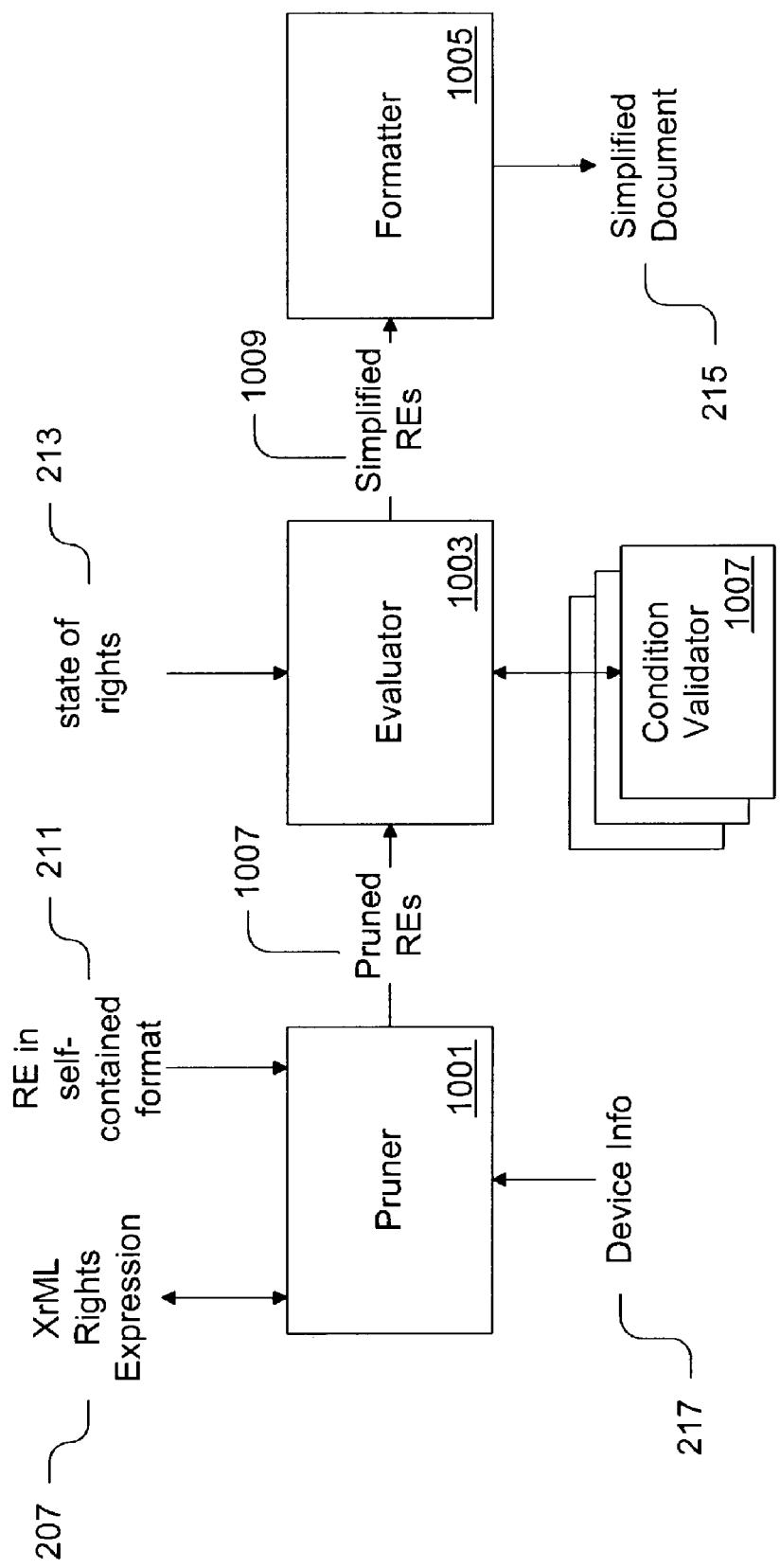
FIG. 10 is a schematic illustration of exemplary simplifier processes that can be implemented on the Digital Rights Management systems of FIGS. 1, 4 and 5.

FIG. 10 is a schematic illustration of the exemplary simplifier processes 203 that can be implemented on one or more of the devices and sub-systems of the Digital Rights Management systems of FIGS. 1, 4 and 5. In FIG. 10 the semantic meanings of one or more rights expressions in the rights expression 207 document can be included in the exemplary self-contained format 211, and can be employed by the exemplary simplifier processes 203 to evaluate, reduce, the rights expressions in order to generate the rights expressions 207 document in the exemplary simplified format 215.

The exemplary simplifier processes 203 can perform simplification of one or more rights expressions in a rights expressions 207 document. Such a simplification can include determining the semantic meaning of the rights expressions, evaluating the rights expressions based the device information 217 for the targeted computing environment and determining the status of the rights expressions based on the state of rights information 213.

Exemplary pruner processes 1001 can prune or remove, one or more rights expressions from the rights expression 207 document that are not employed by the targeted computing environment, for example, based on the device information 217. The exemplary pruner processes 1001 can be used to generate the rights expressions in a pruned form 1007 that can be supported by the targeted computing environment. As an example, if the targeted computing environment is a cell phone that cannot print or play digital content, all elements relating to these functions can be pruned.

Exemplary evaluator processes 1003 can be employed for evaluating one or more conditions, elements, in the rights expressions in the pruned form 1007 based on the state of rights information 213, and, optionally, based on results from exemplary condition validator processes 1007. The exemplary evaluator processes 1003 can be used to generate the rights expressions in a simplified form 1009 by excluding one or more conditions, rights expressions from the pruned rights expressions 1007. For example, if a condition bas been satisfied and will not expire, that condition can be pruned from the rights expression.

Exemplary formatter processes 1005 can be employed for formatting, re-formatting, the simplified rights expressions 1009 to generate the rights expression 207 in the exemplary simplified format 215. The rights expression 207 in the exemplary simplified format 215 can include only the minimal, rights, conditions, that are to be employed, evaluated or otherwise processed.

The exemplary simplifier processes 203 can process the rights expression 207 document or the rights expression 207 document in the exemplary self-contained format 211 a rights expression document can be received by the exemplary simplifier processes 203, and can be transmitted to the exemplary localizer processes 201, which can return the rights expression document in the exemplary self-contained format 211 to the exemplary simplifier processes 203.

Figure 11:
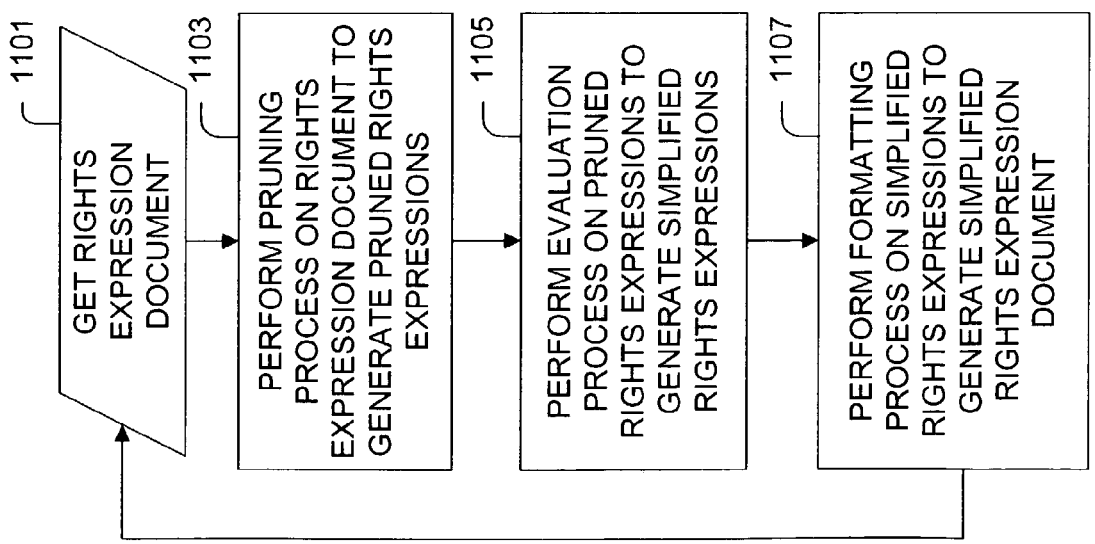
FIG. 11 is a flowchart for illustrating the exemplary simplifier processes of FIG. 10.

FIG. 11 is a flowchart for illustrating the exemplary simplifier processes 203 of FIG. 10. In FIG. 11, at step 1101 the exemplary simplifier processes 203, can be used to receive the rights expression 207 document including one or more rights expressions. At step 1103 the exemplary pruner processes 1001 can perform the pruning of the rights expressions, based on the device information 217 to generate the rights expressions in the pruned form 1007. At step 1103 right expressions portions that cannot be processed by the targeted computing environment can be eliminated from the rights expression 207 document. For example, if the targeted computing environment is not able to print, then a print right can be eliminated from the rights expression 207 document.

At step 1105 the exemplary evaluator processes 1003 can be used to process the pruned rights expressions 1007 to extract one or more conditions, from the pruned rights expressions 1007 for evaluation. Exemplary evaluator processes 1003 can attempt to evaluate the extracted conditions, based on the state of rights information 213 to generate the simplified rights expressions 1009.

At step 1107 the exemplary formatter processes 1005 can be used to convert the simplified rights expressions 1009 into the rights expression 207 document in the exemplary simplified format 215. The rights expression 207 document in the exemplary simplified format 215 can include minimal rights expressions and conditions, that are to be later evaluated in order to authorize a user, device, system, to exercise one or more rights within the rights expression 207 document, file, and like.

Figure 12A:
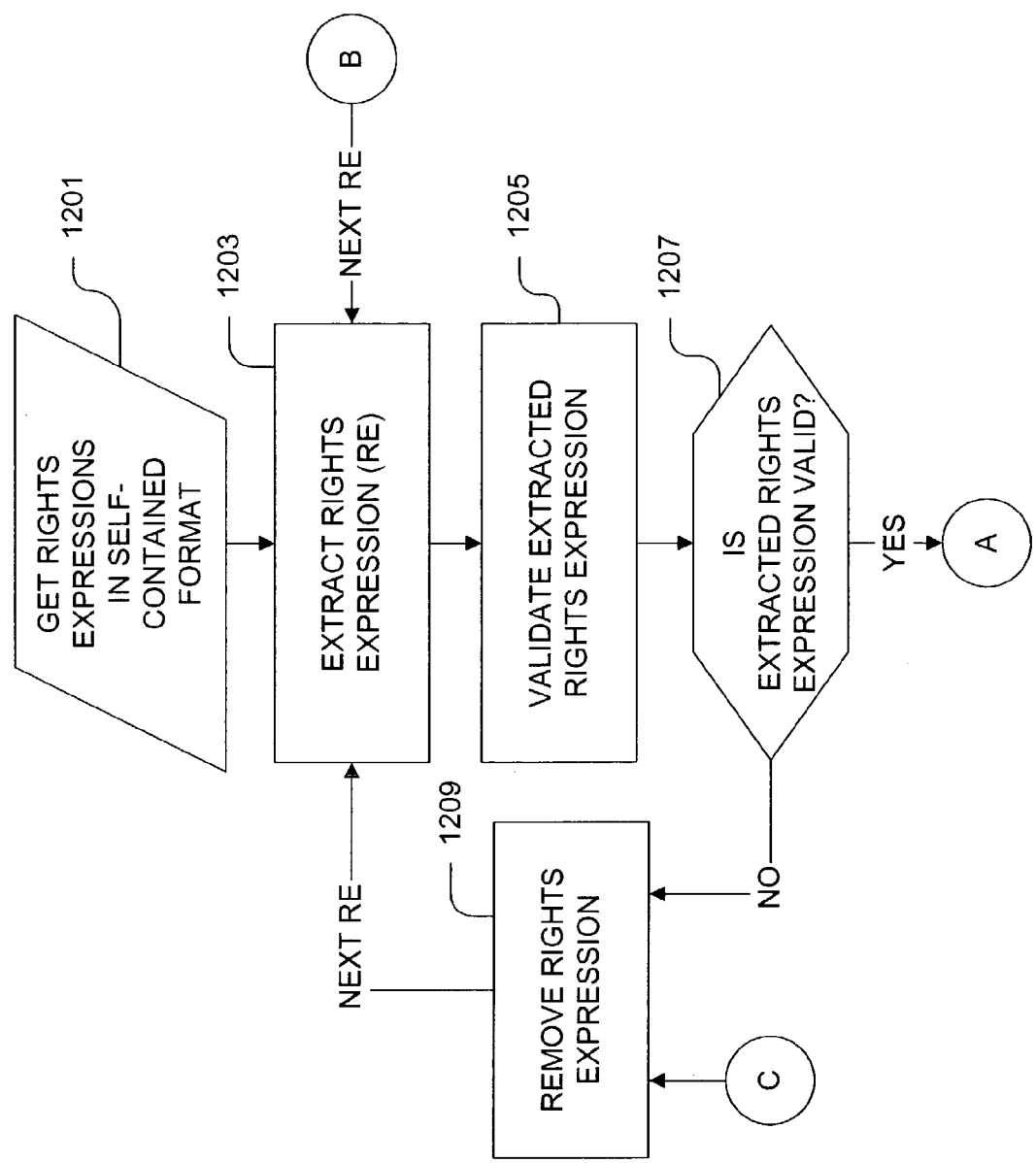
FIGS. 12A-12B are a flowchart for illustrating exemplary pruning and evaluator processes of FIG. 10.
Figure 12B:
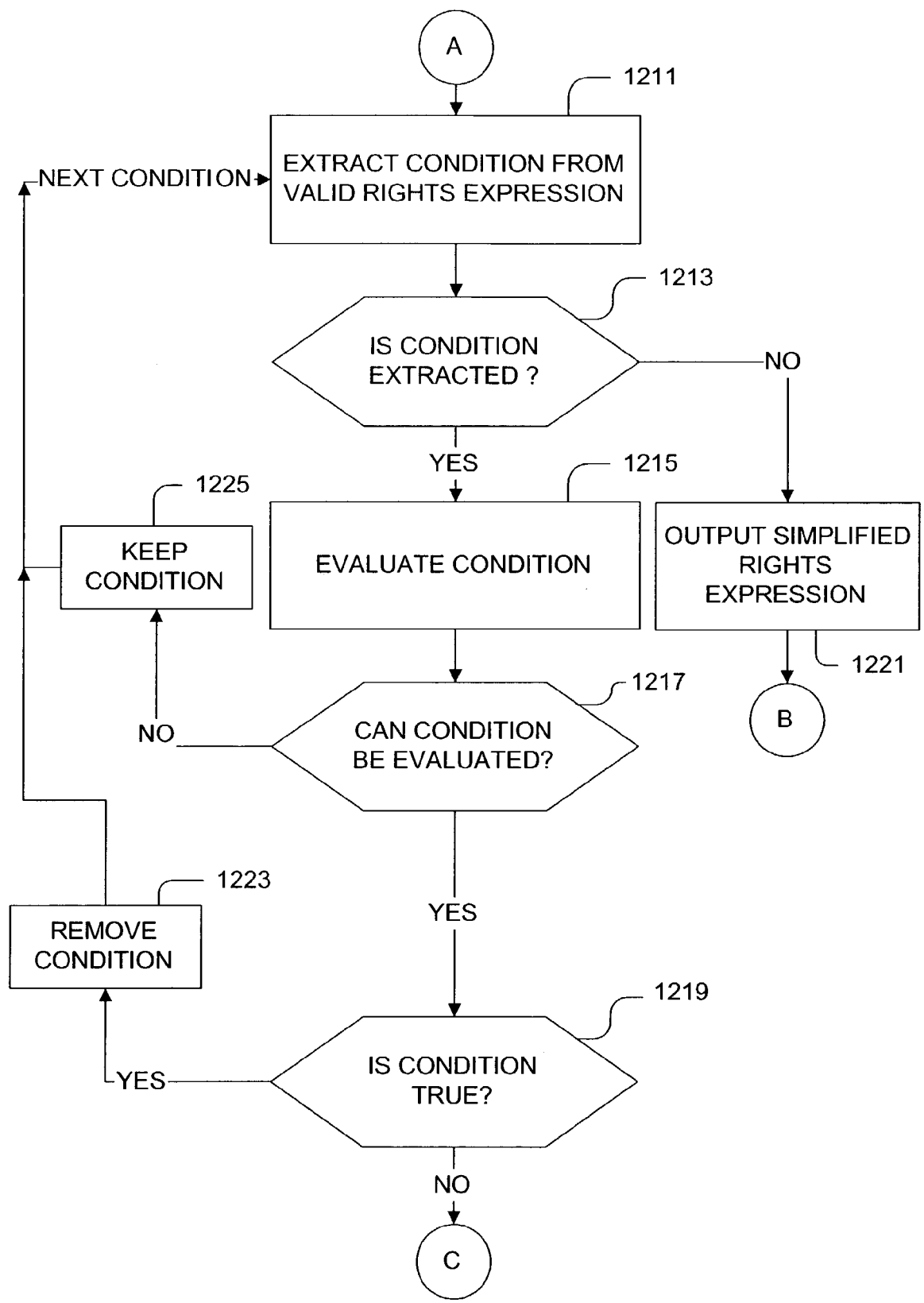

FIG. 12A-12B are a flowchart for further illustrating the exemplary pruning processes 1001 and the exemplary evaluator processes 1003 of FIG. 10, wherein FIG. 12A corresponds to the exemplary pruning processes 1001, and FIG. 12B corresponds to the exemplary evaluator processes 1003. In FIG. 12A, at step 1201 the rights expression 207 document, file, in the exemplary self-contained format 211, can be retrieved.

At step 1203 a rights expression can be extracted from the rights expression 207 document for further processing. At step 1203 the extracted rights expression can be validated. If the extracted rights expression is determined to be valid, as determined at step 1207 the extracted rights expression can be transmitted, passed, to the exemplary evaluator processes 1003 of FIG. 12B for further processing. If, however, the extracted rights expression is determined to be invalid, as determined at step 1207 the extracted rights expression can be removed from the rights expression 207 document, and, at step 1203, a next rights expression can be processed.

Accordingly, in FIG. 12B, at step 1211 a condition, if any, can be extracted from the valid rights expression. At step 1213 it is determined whether or not a condition has been the extracted from the valid rights expression, and if not, the valid rights expression can be output as the rights expression in the simplified form 1009, and, at step 1203 of FIG. 12A, a next rights expression can be processed. Otherwise, at step 1215 the exemplary evaluator processes 1003 can be used to evaluate, validate, the extracted condition.

In a further exemplary embodiment, however, the exemplary condition validator processes 1007 can be employed to validate, evaluate, an extracted condition. Accordingly, the exemplary evaluator processes 1003 can send, transmit, one or more of the extracted conditions to a respective one or more of the exemplary condition validator processes 1007. In an exemplary embodiment, the evaluation results for the extracted condition as determined by the exemplary evaluator processes 1003 and/or by the exemplary condition validator processes 1007 can include a true value, a false value, or a cannot be evaluated value.

If the extracted condition cannot be evaluated, as determined at step 1217, at step 1225, the extracted condition can be maintained in the corresponding valid rights expression, and, at step 1211, a next condition can be processed. If the extracted condition can be evaluated, as determined at step 1217, and the condition evaluation result is true, as determined by step 1219, the extracted condition can be removed from the corresponding valid rights expression, and, at step 1211, a next condition can be processed. If the extracted condition can be evaluated, as determined at step 1217, and the condition evaluation result is false, as determined by step 1219, the valid rights expression can be removed from the rights expression 207 document, and, at step 1203 of FIG. 12A, a next rights expression can be processed.

The exemplary simplifier processes 203 can be employed to determine valid rights within a rights expression, to evaluate conditions associated with the valid rights, to maintain conditions that cannot be evaluated, to remove conditions having evaluation results with true values from the valid rights conditions, to remove valid rights associated with conditions having evaluation results with false values.

The exemplary self-contained format 211 can include the exemplary binary format, a variation of the exemplary binary format, wherein the context table can be optional, referred to as the exemplary enforceable format. In the exemplary enforceable format, the context id column can be removed from the semantics table. The context and/or the semantics table, can be pre-built, pre-defined, pre-stored, in the targeted computing environment. In this way, the exemplary self-contained format 211 can include the rights expressions that need to be further evaluated with no need to include the context table and/or the semantics table.

The exemplary enforceable format can be platform-neutral and much more compact than both than a native format, such as XrML, and the exemplary binary format. With the exemplary enforceable format, typically there is no need to employ external rights interpretation resources to understand the semantic meanings of the rights expression since this has been resolved, interpreted.

In addition, with the exemplary enforceable format there typically is no need for a full rights expression processing system, because a simple validator can be sufficient to authorize a request and can be employed to read conditions, parameters, from the exemplary enforceable format, and locate and invoke, a rights condition validator. In addition, the exemplary enforceable format can be the most optimized of the formats while still being platform-independent, can be employed in resource-constrained computing environments can be the most efficient of the formats for high-performance operations.

A rights expression 207 can be converted into the exemplary enforceable format, with no need to employ a context table. The exemplary enforceable format, thus, can be employed where no conflicts exist in the elements of a rights expression and the targeted computing environment can understand the context of the corresponding rights in the rights expression. The context table, and the context id column of the semantics table need not be employed with the exemplary enforceable format.

The following third exemplary rights expression in the form of an XrML-based license to play a music, can be used to further illustrate an exemplary semantics table.

Third Exemplary Rights Expression

```
<license xmlns=http://www.xrml.org/schema/2001/11/xrml2core
    xmlns:sx=http://www.xrml.org/schema/2001/11/xrml2sx
    xmlns:dsig=http://www.w3.org/2000/09/xmldsig#
    xmlns.xsi=http://www.w3.org/2001/XMLSchema-instance
```

-continued

```
    xmlns:cx=http://www.xrml.org/schema/2001/11/xrml2cx
    xmlns:cm=
        http://www.xrml.org/schema/2001/11/xrml2compactMusic
>
    <grant>
    <cm:device cmid="123"/>
    <cx:play/>
    <cm:music cmid="456"/>
    <sx:validityIntervalFloating>
        <sx:stateReference>
            <cm:intervalKeeper key="777">
                <cm:device cmid="123"/>
            </cm:intervalKeeper>
        </sx:stateReference>
    </sx:validityIntervalFloating>
    </grant>
<cm:issuerDevice>
    <cm:device cmid="024"/>
</cm:issuerDevice>
    </license>
```

An exemplary semantics table, based on the third exemplary rights expression, in Table 6 below.

TABLE 6

Exemplary Semantics Table.

| element id | element type | element name |
|---|---|---|
| 01 | 10 | license |
| 02 | 11 | grantGroup |
| 03 | 12 | grant |
| 04 | 13 | principal |
| 05 | 14 | rights |
| 06 | 15 | resource |
| 07 | 16 | allConditions |
| 08 | 17 | condition |
| 09 | 18 | issuer |
| 10 | 20 | inventory definition |
| 11 | 21 | variable definition |
| 12 | 22 | reference |
| 20 | 01 | device |
| 21 | 02 | cmid |
| 22 | 01 | play |
| 23 | 01 | music |
| 24 | 01 | validityIntervalFloating |
| 25 | 01 | stateReference |
| 26 | 01 | intervalKeeper |
| 27 | 02 | key |
| 28 | 01 | issuerDevice |

The third exemplary rights expression converted into the exemplary enforceable format, based on the exemplary Tables 3 and 6, is as follows:

01 02 04 202103123 05 22 06 232103456 08 24 0025 00262703777 09 28 00202103024,
where:

| 01 | <license> |
|---|---|
| 02 | <grant> |
| 04 | principal [processing instruction] |
| 202103123 | <cm:device cmid="123"/> |
| 05 | rights [processing instruction] |
| 22 | <cx:play> |
| 06 | resource [processing instruction] |
| 232103456 | <cm:music cmid"456"/> |
| 08 | condition |
| 24 | <sx:validityIntervalFloating> |
| 0025 | next level <sx:stateReference> |
| 00262703777 | next level <cm:intervalKeeper key="777"> |
| 09 | issuer [processing instruction] |

| | |
|---|---|
| 28 | \<cm:issuerDevice\> |
| 00202103024 | next level \<cm:device cmid="024"/\> |

The semantics table can be pre-built, pre-defined or pre-stored, in the targeted computing environment. In this way, the exemplary enforceable format can include the rights expressions that need to be further evaluated with no need to include the semantics table.

By converting rights expression into the simplified format 211, a more efficient, more compact format can be employed for enforcing rights, as compared to employing the rights expression in their native format, such as XrML. However, in computing environments, where platform-independence need not be employed, such as homogeneous environments where devices can be part of a single platform, further optimization can be accomplished.

Accordingly, the exemplary translator processes 205 can include devices, components, applications, functions, systems, platforms, responsible for translating the exemplary simplified format 211 into the exemplary device-specific format 219. The exemplary device-specific format 219 can be made specific to a targeted computing environment, and can be more efficiently consumed by the targeted computing environment.

A rights expression in the exemplary device-specific format 219 can vary from device to device, but, generally, can be in the form of a data structure that can include conditions to be validated and a list of processing instructions to be carried out in order to authorize a request to exercise a right within the rights expression. Exemplary device-specific formats 219 that into which the exemplary translator processes 205 can translate the rights expression 207 are formats based on glyphs, formats based on profiles, formats based on templates, formats that can be processed by a specific device, such as an MP3 device, a set-top box.

In an exemplary embodiment, the targeted computing environment can be configured to run a programming language such as the PROgramming in LOGic (Prolog) language, and an exemplary rights expression can be configured to specify, for example, that "Alice can view a video identified by 123456 no more than 5 times." The exemplary rights expression can be translated by a Prolog translator into the following Prolog expression:

```
(1) Principal("Alice"),
(2) Video("123456"),
(3) View(p, r) :-
(4) Principal(p),
(5) Video(r),
(6) Count(5).
```

However, the targeted computing environment may be configured to employ a data structure given by:

```
Struct
{
Rights : byte; // 01 : View, 02: Print . . .
Principal: char[20];
ConditionList;
}
```

```
ConditionList
{
Number of condition: 2 byte integer
{
   ConditionID: 1 byte ; // 01 FIat Fee, 02 MaxCount
   Conditon Value: 4 byte integer
}
}
```

Accordingly, the exemplary rights expression can be translated by the exemplary translator processes 205 configured for the targeted Prolog computing environment into the following stream of bytes:

IAlice 01020005

The exemplary binary format can include the rights expressions from an XrML document, and the semantic meanings of the elements used in the rights expressions. The structure of rights expressions in the exemplary binary format can be similar to the structure of the rights expressions in the XrML document, such as native XML.

The binary structure of the exemplary binary format can be processed by any suitable application, device, system, platform, without the need for external resources, such as XML resources, parsers. Since the semantic meanings for the elements of the rights expressions can be included in the exemplary binary format, no XML schemes, need be employed in order to interpret the meanings of the rights expressions.

Accordingly, as compared to the rights expressions in an XrML format, the rights expressions in the exemplary binary format, can be platform-neutral and platform-independent. In addition, when employing the rights expressions in the exemplary binary format, there is increased performance because of a reduced need for external resources, such as XML parsers, schema parsers, which otherwise would be needed to process and interpret the meanings of the rights expression in conventional formats.

The exemplary binary transformation algorithm can be employed on a digital signature to preserve the digital signature between an original document, such as an XrML document, and the binary document in the exemplary binary format, to ensure the integrity of the original document.

FIG. 13 is a schematic illustration of a structure 1300 of the exemplary binary format. In FIG. 13 in an exemplary embodiment, a file in the exemplary binary format can include a prolog section 1301, a context table section 1303, a semantics table section 1305, a rights expression section 1307, and a signature table section 1309. However, the signature table section 1309 can be eliminated from the file by providing the signature table section 1309 information as redundant information in one or more of the other sections 1301-1307 of the file.

The prolog section 1301 can include information about the exemplary binary format, including version number, vendor information, and the id of the original document. The prolog section 1301 can include a magic number field that can be used to indicate a format of the file such as the exemplary enforceable format, the exemplary binary format, and an optimized version of the exemplary binary format that can eliminate the context table and semantics table. The prolog section 1301 can further include a version number field for indicating a version number of the format employed in the file, a first pointer field that can include a pointer to the context table within the file, a second pointer field that can include a pointer to the semantics table within the file, a third pointer field that can include a pointer to the rights expression within the file.

The context table section 1303 can include the context table of namespaces used in the original document. In addition, the context table section 1303 can be configured with one entry per namespace including the context id, which can include a unique identification for each namespace. The context id can be assigned based on the occurrence of an element within the original document of the corresponding context. When the rights expression language can be extensible and derived from a core language, a base language, the first context id can be assigned to the core context, regardless of where the elements of the core context can be used within the original document. The context table section 1303 can further include a length of namespace URI for specifying the length of the namespace, and a namespace URI for identifying the namespace, the context.

The semantics table section 1305 can include one semantics table per namespace. The semantics table can include information for each element of that namespace used in the rights expression. In addition, the semantics table section 1305 can be configured to include information for each element of the namespace used in the rights expression. Further, the semantics table section 1305 can be configured with one entry per element, including an element id that can be a unique id assigned to an element, and with fixed ids that can be assigned for the core elements.

The semantics table section 1305 can include an element type for specifying a type of element. The pre-defined element types can be specified as shown in Table 3, the exemplary pre-defined type table. The semantics table section 1305 can include an element name for specifying a name of an element, as defined in the schema, and an element context id corresponding to a context id of the namespace that includes the element.

The rights expression section 1307 can include a rights expression (RE), with an exemplary structure that can be given as follows:

| | |
|---|---|
| RE = "seq" \| ["seq "]$_{1..n}$ | |
| where | |
| "seq" | = "type" \| "specialType," |
| "sepecialType" | = [02\03]"length," "value," |
| "length" | = length of the "value" in bytes, |
| "value" | = sequence of bytes, |
| "type" | = id defined in the "pre-defined type table" except 02 and 03. |

In the above exemplary structure of the rights expression, the term RE="seq"\|["seq"]$_{1...n}$ can indicate that the rights expression can include a sequence "seq" or one or more sequences ["seq"]$_{1...n}$ of expressions, where "seq" can be a "type" or "specialType," "specialType" can be of the type 02 or 03 from the pre-defined type table and can have "length" and "value," where "length" can be the length of the "value" in bytes, "value" can be a sequence of bytes, and "type" corresponds to the id from the pre-defined type table, except for ids 02 and 03, which correspond to attribute and value types from the pre-defined type table.

There can be various formats for the simplified format 215, such as the exemplary binary format and a variation of the exemplary binary format, wherein the context table can be optional, referred to as the exemplary enforceable format. In addition, when the context table is not included in the exemplary simplified format 215, then the context id column can be omitted from the corresponding semantics table.

FIG. 14 is a schematic illustration of an exemplary structure 1400 of the exemplary enforceable format. In FIG. 13, the structure 1300 of the exemplary binary format can include the prolog section 1301, the context table section 1303, the semantics table section 1305, the rights expression section 1307 and the signature table section 1309. As shown in FIG. 14, however, the exemplary enforceable format can include the prolog section 1301, the semantics table section 1305 and the rights expression section 1307. Accordingly, the exemplary structure 1400 can be configured in a similar manner as the exemplary structure 1300, as previously described, except for the omission of the context table section 1303, the signature table section 1309, and the context id column from the semantics table.

According to the exemplary embodiments, the device-specific formats 219 that the exemplary translator processes 205 can translate the rights expression into can include formats based on glyphs, formats based on profiles, formats based on templates, formats based on a Prolog program, formats that can be processed by a specific device, such as an MP3 device, a set-top box.

A symbolic representation can be employed to encode a rights expression. The symbolic representation can include a graphical representation, such as based on glyphs, a modulated or varied signal-based representation, such as those based on modulated or varied light or sound signals. Thus, the symbolic representation of a rights expression can be encoded, derived, based on glyph structures, based on star-shaped structures, square-shaped structures, rectangular-shaped structures, circular-shaped structures, triangular-shaped structures, or portions thereof. In a similar manner, a rights expression can be encoded, derived, based on modulated or varied signals, lights, sounds, series of sounds, light pulses, using at any suitable frequency and amplitude, including ultraviolet waves, x-rays, microwaves, radio waves, employing lasers, modulated or convoluted information, different colors or wavelengths, electric or magnetic field variations.

FIG. 15 illustrates an exemplary symbolic representation of the rights expression 207 that can be generated by the exemplary translator processes 205 based on exemplary symbols, such a glyphs. In FIG. 15, an exemplary symbolic representation can be derived from a glyph structure based on a star-shaped structure, and can be used for expressing the rights expression 207. In an exemplary embodiment, the symbols 1501-1504 derived from the star-shaped structure can be taken from the Red, Green, and Blue (RGB) color space. Thus, the symbols 1501-1504 of the star-shaped structure can include the Red (R), Green (G), and/or Blue (B) colors. Accordingly, in a basic case, wherein no colors can be combined, 12 symbols can be generated (four symbols times three colors). To increase the number of members or symbols, however, complex symbols 1511-1519 having overlapping colors can be generated, as shown in FIG. 15.

Thus, two or more symbols of different colors up to all 12 symbols, can be combined to overlap on a physical location, to potentially produce part or all of the star-shaped structure in different colors, or combination of colors for each part of the star shape the color of the resulting horizontal symbol 1501 of the complex symbol 1511 can be based on the combination of Green and Red symbols 1501. In this way, the symbols 1501-1504, in various color combinations, can be used to generate the complex symbols 1511-1519, as shown in FIG. 15.

Accordingly, the number of complex symbols in the exemplary symbol set illustrated by FIG. 15 can be $(2^{12}-1)$ or 4095 symbols, assuming that a blank space is not considered a symbol with the numerous choices for the complex symbols provided by the exemplary embodiment, correspondingly complex and comprehensive symbolic representations of information, such as information for grammar, language, for a rights expressions can be generated.

as shown in FIG. 15, the exemplary rights expression 207 can indicate an expiration date for access to an e-book and can be expressed using the exemplary complex symbol set. In FIG. 15, the symbols 1511-1519 can be used to express the rights expression 207 for a book identification (ID) number in a database being 245, which refers to a novel by a given author, and an access expiration date being Jul. 12, 2003.

Accordingly, the first complex symbol 1511 can be used to express the phrase "Book (or resource) ID number," the second complex symbol 1513 can be used to express the integer "245," the third complex symbol 1515 can be used to express the phrase "Access/expiration date," the fourth complex symbol 1517 can be used to express day and month of the year "July 12," or 7-12), the fifth complex symbol 1519 can be used to express the year "2003," and the like. Further any suitable rights expression can be expressed using one or more symbols, such as glyphs.

The glyphs, symbols, words, messages, of the exemplary embodiments used to convey information about a rights expression can be encoded using light, sound, a series of sounds, light pulses, using at any suitable frequency, amplitude, can include ultraviolet waves, x-rays, microwaves, radio waves, can employ lasers, modulated or convoluted information, different colors or wavelengths, electric or magnetic field variations.

Any suitable series of the glyphs, symbols, words, messages, of the exemplary embodiments employed can have its own grammar, rules, which provide a meaning to a transmitted message a sound or light in a range of frequencies that a human ear or eye cannot detect, can be employed for transmitting the glyphs, symbols, words, messages during security applications, privacy applications. In this way, a transmitted message can be made transparent to a user or users, but at the same can be retrieved and understood, by a suitable sensor, detector. The glyphs, symbols, words, messages, of the exemplary embodiments can be expressed using any suitable human or machine sensing organ or device, so long as that the sensed information, message, can be quantized, digitized, expressed, based on numbers, bits, bytes or another manner.

The device-specific formats 219 that the exemplary translator processes 205 can translate the rights expression 207 into can include formats based on profiles, formats based on templates. An exemplary rights expression in the form of a license granting the right to a specified manner use, such as playing an identified song, on an identified device can be expressed, for example, as follows:

```
<license>
    <grant>
        <cm:device cmid="123"/>
        <cx:play/>
        <cm:music cmid="456"/>
    </grant>
    <cm:issuerDevice>
        <cm:device cmid="024"/>
    </cm:issuerDevice>
</license>
```

Then, according to an exemplary embodiment, the corresponding template, profile, and the like wherein variables in the license are removed, can be generated as the exemplary device-specific format 219 by the exemplary translator processes 205, as follows:

```
<license>
    <grant>
        <cm:device cmid=" "/>
        <cx:play/>
        <cm:music cmid=" "/>
    </grant>
    <cm:issuerDevice>
        <cm:device cmid=" "/>
    </cm:issuerDevice>
</license>
```

One or more of the devices and sub-systems of the Digital Rights Management systems of FIGS. 1, 4 and 5 can communicate over a communications network 170, and can include any suitable servers, workstations, personal computers (PCs), laptop computers, PDAs, Internet appliances, set top boxes, modems, handheld devices, telephones, cellular telephones, wireless devices, resource-constrained devices or other devices, capable of performing the functions of the disclosed embodiments. The devices and sub-systems of the Digital Rights Management systems of FIGS. 1, 4 and 5, can communicate with each other using any suitable protocol and can be implemented using a general-purpose computer system. One or more interface mechanisms can be used in the Digital Rights Management systems of FIGS. 1, 4 and 5, including Internet access, telecommunications in any suitable form, such as voice, modem, wireless communications media. Accordingly, communications network 170 can include wireless communications networks, cellular communications networks, satellite communications networks, Public Switched Telephone Networks (PSTNs), Packet Data Networks (PDNs), the Internet, intranets, hybrid communications networks, combinations thereof. In addition, the communications network 170 can be the same or different networks.

As noted above, it is to be understood that the Digital Rights Management systems of FIGS. 1, 4 and 5 are illustrated for exemplary purposes, as many variations of the specific hardware used to implement the disclosed exemplary embodiments are possible the functionality of the devices and the subsystems of the Digital Rights Management systems of FIGS. 1, 4 and 5 can be implemented via one or more programmed computer systems or devices. To implement such variations as well as other variations, a single computer system can be programmed to perform the special purpose functions of one or more of the devices and subsystems of the Digital Rights Management systems of FIGS. 1, 4 and 5. On the other hand, two or more programmed computer systems or devices can be substituted for any one of the devices and subsystems of the Digital Rights Management systems of FIGS. 1, 4 and 5. Accordingly, principles and advantages of distributed processing, such as redundancy, replication, also can be implemented, as desired to increase the robustness and performance of the Digital Rights Management systems of FIGS. 1, 4 and 5.

The Digital Rights Management systems of FIGS. 1, 4 and 5 as described with respect to FIGS. 1-15, can be used to store information relating to various processes described herein. This information can be stored in one or more memories, such as a hard disk, optical disk, magneto-optical disk, RAM, of the devices and sub-systems of the Digital Rights Management systems of FIGS. 1, 4 and 5. One or more databases of the devices and subsystems of the Digital Rights Management systems of FIGS. 1, 4 and 5 can store the information used to implement the exemplary embodiments. The databases can be organized using data structures, such as records, tables, arrays, fields, graphs, trees, lists, included in one or more memories, such as the memories listed above.

All or a portion of the Digital Rights Management systems of FIGS. 1, 4 and 5 as described with respect to FIGS. 1-15, can be conveniently implemented using one or more general-purpose computer systems, microprocessors, digital signal processors, micro-controllers, programmed according to the teachings of the disclosed exemplary embodiments. Appropriate software can be readily prepared by programmers of ordinary skill based on the teachings of the disclosed exemplary embodiments. In addition, the Digital Rights Management systems of FIGS. 1, 4 and 5 can be implemented by the preparation of application-specific integrated circuits or by interconnecting an appropriate network of component circuits.

the exemplary embodiments described herein can be employed in offline systems, online systems, and in applications, such as TV applications, computer applications, DVD applications, VCR applications, appliance applications, CD player applications. In addition, the signals employed to transmit the glyphs, symbols, words, messages, of the exemplary embodiments, can be configured to be transmitted within the visible spectrum of a human, within the audible spectrum of a human, not within the visible spectrum of a human, not within the audible spectrum of a human, combinations thereof.

Although, the exemplary embodiments can be described in terms of employing XrML, XML, the exemplary embodiments are not so limited, but also can be practiced with any suitable grammar, language, whether or not XrML-based, XML-based.

While the present invention have been described in connection with a number of embodiments and implementations, the present invention is not so limited, but rather covers various modifications and equivalent arrangements, which fall within the purview of the appended claims.

What is claimed is:

1. A computer implemented method for processing a rights expression for association with an item for use in a digital rights management system for controlling the use of the item in accordance with the rights expression, said method comprising:
   specifying in a license a rights expression in an original format; and
   generating an intermediate format for said rights expression based on at least one of syntax information and semantics information associated with said original format,
   wherein said rights expression specifies a manner of use of said item for enforcement on a device, and
   said rights expression is encoded with a grammar-based expression language, and
   said intermediate format is for controlling the use of said item in accordance with the manner of use specified in said rights expression.

2. The method as recited in claim 1, wherein said intermediate format is translated into a device-dependent format for enforcement of said rights expression on said device.

3. The method as recited in claim 2, wherein said device comprises a resource constrained device or a function-limited device.

4. The method as recited in claim 1, wherein said intermediate format comprises a device-independent format.

5. The method as recited in claim 1, wherein said item comprises one of a digital work, a service, an abstract object, a resource, and goods.

6. The method as recited in claim 1, wherein said generating step comprises:
   a localization process including converting said rights expression into a self-contained format based on said at least one of said syntax and semantics information.

7. The method as recited in claim 6, wherein said self-contained format includes a binary representation of said rights expression.

8. The method as recited in claim 6, wherein said localization process comprises:
   retrieving referenced information and replacing a reference in said rights expression with said referenced information.

9. The method as recited in claim 6, further comprising:
   a simplifying process including converting said self-contained format into a simplified format by excluding conditions from said rights expression that are not to be enforced on said device.

10. The method as recited in claim 9, wherein said simplifying process comprises:
    converting non-excluded conditions into a binary representation thereof.

11. The method as recited in claim 9, wherein said simplifying process comprises:
    replacing variables with values in said rights expression.

12. The method as recited in claim 9, wherein said simplifying process comprises:
    eliminating at least one of redundant information and expressions from said rights expression.

13. The method as recited in claim 10, wherein said non-excluded conditions include conditions that must be satisfied in order to exercise said manner of use of said item.

14. The method as recited in claim 1, further comprising:
    a translation process including converting said intermediate format into a device-specific format being adapted for enforcement of said rights expression by said device.

15. The method as recited in claim 14, wherein said device-specific format includes a binary representation of said rights expression.

16. The method as recited in claim 1, wherein said device comprises a handheld device.

17. The method as recited in claim 1, wherein said device comprises a resource-constrained device.

18. The method as recited in claim 1, wherein said device comprises a multi-processor device.

19. The method as recited in claim 1, wherein said device comprises a rendering device.

20. The method as recited in claim 1, wherein said rights expression is grammar-based.

21. The method as recited in claim 15, wherein said device-specific format comprises a graphical representation of said rights expression.

22. The method as recited in claim 21, wherein said graphical representation comprises one or more glyphs.

23. The method as recited in claim 16, wherein said device-specific format comprises a modulated signal based representation of said rights expression.

24. The method as recited in claim 23, wherein said modulated signal based representation of said rights expression comprises a modulated light signal.

25. The method as recited in claim 23, wherein said modulated signal based representation of said rights expression comprises a modulated sound signal.

26. The method as recited in claim 15, wherein said device-specific format comprises a profile or template of said rights expression, said profile or template including said rights expression with one or more variable values removed from said rights expression.

27. A system for processing a rights expression for association with an item for use in a digital rights management system for controlling the use of the item in accordance with the rights expression, said system comprising:
 a license specifying a rights expression in an original format; and
 means for generating an intermediate format for said rights expression based on at least one of syntax information and semantics information associated with said original format, grammar-based language
 wherein said rights expression specifies a manner of use of said item for enforcement on a device, and
 said rights expression is encoded with a grammar-based expression language, and
 said intermediate format is for controlling the use of said item in accordance with the manner of use specified in said rights expression.

28. The system as recited in claim 27, wherein said intermediate format is translated into a device-dependent format for enforcement of said rights expression on said device.

29. The system as recited in claim 28, wherein said device comprises a resource constrained device or a function-limited device.

30. The system as recited in claim 27, wherein said intermediate format comprises a device-independent format.

31. The system as recited in claim 27, wherein said item comprises one of a digital work, a service, an abstract object, a resource, and goods.

32. The system as recited in claim 27, wherein said means for generating comprises:
 means for performing a localization process including converting said rights expression into a self-contained format based on said at least one of said syntax and semantics information.

33. The system as recited in claim 32, wherein said self-contained format includes a binary representation of said rights expression.

34. The system as recited in claim 32, wherein said means for performing a localization process comprises:
 means for retrieving referenced information and replacing a reference in said rights expression with said referenced information.

35. The system as recited in claim 32, further comprising: means for performing a simplifying process including converting said self-contained format into a simplified format by excluding conditions from said rights expression that are not to be enforced on said device.

36. The system as recited in claim 35, wherein said means for performing a simplifying process comprises:
 means for converting non-excluded conditions into a binary representation thereof.

37. The system as recited in claim 35, wherein said means for performing a simplifying process comprises:
 means for replacing variables with values in said rights expression.

38. The system as recited in claim 35, wherein said means for performing a simplifying process comprises:
 means for eliminating at least one of redundant information and expressions from said rights expression.

39. The system as recited in claim 36, wherein said non-excluded conditions include conditions that must be satisfied in order to exercise said manner of use of said item.

40. The system as recited in claim 27, further comprising:
 means for performing a translation process including converting said intermediate format into a device-specific format being adapted for enforcement of said rights expression by said device.

41. The system as recited in claim 40, wherein said device-specific format includes a binary representation of said rights expression.

42. The system as recited in claim 27, wherein said device comprises a handheld device.

43. The system as recited in claim 27, wherein said device comprises a resource-constrained device.

44. The system as recited in claim 27, wherein said device comprises a multi-processor device.

45. The system as recited in claim 27, wherein said device comprises a rendering device.

46. The system as recited in claim 27, wherein said rights expression is grammar-based.

47. The system as recited in claim 41, wherein said device-specific format comprises a graphical representation of said rights expression.

48. The system as recited in claim 47, wherein said graphical representation comprises one or more glyphs.

49. The system as recited in claim 41, wherein said device-specific format comprises a modulated signal based representation of said rights expression.

50. The system as recited in claim 49, wherein said modulated signal based representation of said rights expression comprises a modulated light signal.

51. The system as recited in claim 49, wherein said modulated signal based representation of said rights expression comprises a modulated sound signal.

52. The system as recited in claim 41, wherein said device-specific format comprises a profile or template of said rights expression, said profile or template including said rights expression with one or more variable values removed from said rights expression.

53. The system as recited in claim 27, wherein said means for specifying and said means for generating comprise devices of a computer system.

54. The system as recited in claim 27, wherein said means for specifying and said means for generating comprise computer readable instructions recorded on a medium.

55. The method as recited in claim 1, wherein said device comprises an activated client environment.

56. The method as recited in claim 55, wherein said activated client environment is activated by an activation server.

57. The method as recited in claim 56, wherein said activated client environment comprise at least one key received from the activation server during activation.

58. The method as recited in claim 55, wherein said activated client environment comprises a set of public and private key pairs.

59. The method as recited in claim 55, wherein said activated client environment comprises user and/or machine specific information.

60. The method as recited in claim 1, wherein said intermediate format comprises program instruction codes for enforcement of said rights expression by said device.

61. The method as recited in claim 1, wherein said intermediate format comprises a data structure or object for enforcement of said rights expression by said device.

62. The method as recited in claim 1, wherein said generating step comprises verifying the authenticity of said rights expression.

63. The system as recited in claim 27, wherein said device comprises an activated client environment.

64. The system as recited in claim 63, wherein said activated client environment is activated by an activation server.

65. The system as recited in claim 64, wherein said activated client environment comprise at least one key received from the activation server during activation.

66. The system as recited in claim 63, wherein said activated client environment comprises a set of public and private key pairs.

67. The system as recited in claim 63, wherein said activated client environment comprises user and/or machine specific information.

68. The system as recited in claim 27, wherein said intermediate format comprises program instruction codes for enforcement of said rights expression by said device.

69. The system as recited in claim 27, wherein said intermediate format comprises a data structure or object for enforcement of said rights expression by said device.

70. The system as recited in claim 27, wherein said generating means comprises means for verifying the authenticity of said rights expression.

\* \* \* \* \*

(12) INTER PARTES REVIEW CERTIFICATE (2nd)
United States Patent
Ta et al.

(10) Number: US 7,359,884 K1
(45) Certificate Issued: Jan. 14, 2014

(54) METHOD AND APPARATUS FOR PROCESSING USAGE RIGHTS EXPRESSIONS

(75) Inventors: Thanh Ta; Guillermo Lao; Xin Wang; Michael C. Raley; Charles P. Gilliam; Manuel Ham; Bijan Tadayon

(73) Assignee: Contentguard Holdings, Inc.

Trial Number:

IPR2013-00136 filed Feb. 11, 2013

Petitioner: ZTE Corporation & ZTE (USA), Inc.

Patent Owner: Contentguard Holdings, Inc.

Inter Partes Review Certificate for:

Patent No.: 7,359,884
Issued: Apr. 15, 2008
Appl. No.: 10/388,226
Filed: Mar. 14, 2003

The results of IPR2013-00136 are reflected in this inter partes review certificate under 35 U.S.C. 318(b).

INTER PARTES REVIEW CERTIFICATE
U.S. Patent 7,359,884 K1
Trial No. IPR2013-00136
Certificate Issued Jan. 14, 2014

AS A RESULT OF THE INTER PARTES REVIEW PROCEEDING, IT HAS BEEN DETERMINED THAT:

Claims 1-8, 14-22 and 55-62 are canceled.

\* \* \* \* \*